(12) United States Patent
Ishimi et al.

(10) Patent No.: US 8,471,885 B2
(45) Date of Patent: Jun. 25, 2013

(54) IMAGE PROCESSING METHOD AND IMAGE PROCESSING APPARATUS

(75) Inventors: Tomomi Ishimi, Shizuoka (JP); Shinya Kawahara, Shizuoka (JP); Toshiaki Asai, Shizuoka (JP); Yoshihiko Hotta, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 13/180,814

(22) Filed: Jul. 12, 2011

(65) Prior Publication Data

US 2012/0013701 A1 Jan. 19, 2012

(30) Foreign Application Priority Data

Jul. 13, 2010 (JP) ................... 2010-158741

(51) Int. Cl.
*B41J 2/47* (2006.01)
(52) U.S. Cl.
USPC .......................................................... 347/253
(58) Field of Classification Search
USPC ................. 347/110, 224, 225, 236, 240, 246, 347/251–254
See application file for complete search history.

(56) References Cited

U.S. PATENT DOCUMENTS

| | | | | |
|---|---|---|---|---|
| 5,355,231 A | * | 10/1994 | Murata | 358/443 |
| 6,310,624 B1 | * | 10/2001 | Watanabe | 345/467 |
| 7,439,993 B2 | | 10/2008 | Ishimi et al. | |
| 7,728,860 B2 | | 6/2010 | Kawahara et al. | |
| 2008/0151033 A1 | | 6/2008 | Ishimi et al. | |
| 2008/0153698 A1 | | 6/2008 | Kawahara et al. | |
| 2008/0192618 A1 | * | 8/2008 | Nakata et al. | 369/120 |
| 2008/0214391 A1 | | 9/2008 | Kawahara et al. | |
| 2009/0075816 A1 | | 3/2009 | Kawahara et al. | |
| 2009/0203521 A1 | | 8/2009 | Ishimi et al. | |
| 2010/0039916 A1 | | 2/2010 | Hasegawa et al. | |
| 2010/0054106 A1 | | 3/2010 | Asai et al. | |
| 2010/0061198 A1 | | 3/2010 | Kawahara et al. | |
| 2010/0069238 A1 | | 3/2010 | Asai et al. | |
| 2010/0069239 A1 | | 3/2010 | Asai et al. | |
| 2010/0197492 A1 | | 8/2010 | Kawahara et al. | |
| 2011/0090299 A1 | | 4/2011 | Asai et al. | |

FOREIGN PATENT DOCUMENTS

| | | |
|---|---|---|
| JP | 9-30118 | 2/1997 |
| JP | 11-151856 | 6/1999 |
| JP | 2000-136022 | 5/2000 |
| JP | 3161199 | 2/2001 |
| JP | 2004-265247 | 9/2004 |
| JP | 3998193 | 8/2007 |
| JP | 2008-62506 | 3/2008 |
| JP | 2008-213439 | 9/2008 |

* cited by examiner

*Primary Examiner* — Hai C Pham
(74) *Attorney, Agent, or Firm* — Cooper & Dunham LLP

(57) ABSTRACT

An image processing method including calculating a density of a character to be recorded based on information of a type, size and line width of the character; adjusting an irradiation energy of a laser beam for recording the character based on the density of the character; and irradiating a recording medium with the laser beam whose irradiation energy is adjusted so as to record the character thereon.

18 Claims, 7 Drawing Sheets

IMAGE PROCESSING METHOD AND IMAGE PROCESSING APPARATUS

BACKGROUND OF THE INVENTION

1. Field of the Invention

The present invention relates to an image processing method and an image processing apparatus, capable of recording high quality image having less printing bleeding.

2. Description of the Related Art

Image recording and image erasing on a thermoreversible recording medium as a recording medium have been carried out so far by a contact method in which a heating source is brought into contact with the thermoreversible recording medium to heat the thermoreversible recording medium. As the heating source, in the case of image recording, a thermal head is generally used, and in the case of image erasing, a heat roller, a ceramic heater or the like is generally used.

Such a contact image processing method has advantage in that, if a thermoreversible recording medium is a flexible material such as paper, an image can be uniformly recorded and erased by evenly pressing a heating source against the thermoreversible recording medium with use of a platen etc., and an image erasing device can be produced at low costs by using components of a conventional thermosensitive printer.

However, when an RF-ID tag as disclosed in Japanese Patent Application Laid-Open (JP-A) No. 2004-265247 and Japanese Patent (JP-B) No. 3998193 is embedded in a thermoreversible recording medium, the thermoreversible recording medium needs to be thickened and the flexibility thereof degrades, and thus high pressure is required for uniformly pressing a heat source against the thermoreversible recording medium. In addition, in the contact image processing method, a surface of the thermoreversible recording medium is scraped due to repetitive printing and erasure and irregularities are formed therein, and some parts are not in contact with a heating source, such as a thermal head, and hot stamp. Thus, the thermoreversible recording medium may not be uniformly heated, causing degradation in image density and erasing failure (see Japanese Patent (JP-B) No. 3161199 and Japanese Patent Application Laid-Open (JP-A) No. 09-30118).

In view of the fact that RF-ID tag enables reading and rewriting of memory information from some distance away from a thermoreversible recording medium in a non-contact manner, a demand arises for thermoreversible recording media as well. The demand is that an image be rewritten on such a thermoreversible recording medium from some distance away from the thermoreversible recording medium. To respond to the demand, a method using a laser is proposed as a method of uniformly recording and erasing each image on a thermoreversible recording medium from some distance away from the thermoreversible recording medium or when there are irregularities on the surface thereof (see JP-A No. 2000-136022). It is the method by which non-contact recording is performed by using thermoreversible recording media on shipping containers used for physical distribution lines. Writing is performed by using a laser and erasing is performed by using a hot air, heated water, infrared heater, etc.

As such a recording method using a laser, a laser-recording device (laser maker) is proposed by which a thermoreversible recording medium is irradiated with a high-power laser light to control the irradiation position. A thermoreversible recording medium is irradiated with a laser light using the laser marker, and a photothermal conversion material in the thermoreversible recording medium absorbs light so as to convert it into heat, which can record and erase an image. An image recording and erasing method using a laser has been proposed, wherein a recording medium including a leuco dye, a reversible developer and various photothermal conversion materials in combination is used, and recording is performed thereon using a near infrared laser light (see JP-A No. 11-151856).

According to the methods described in JP-A Nos. 2008-62506 and 2008-213439, a thermoreversible recording medium can be uniformly heated, and image quality and durability against repeated use can be improved. However, there is a problem that the time required for image recording and erasing becomes long, due to jump and waiting time between drawing lines.

On the other hand, as a method of printing without rewriting, there are exemplary methods as follows: a printing method in which a surface of a product, such as a plastic, a semiconductor, etc. is irradiated with a laser beam, and then the surface absorbs the laser beam so as to generate heat, which causes deformation, modification and removal, to thereby perform printing; and a printing method in which thermal recording paper for one recording is attached to a product, and then the paper is irradiated with a laser beam so as to partially heat a part to be printed. However, since printing is performed by heat, thermal diffusion adversely affects printing, and this causes a problem that when a small character is printed, character bleeding occurs, causing degradation of visibility.

Thus, at present there has not been provided an image processing method and an image processing apparatus, which can record high quality image having less bleeding, and attain durability against repeated use, by calculating a density of a character to be recorded based on information of a type, size, and line width of the character to be recorded, and adjusting an irradiation energy of the laser beam according to the density.

SUMMARY OF THE INVENTION

The present invention aims to provide an image processing method and an image processing apparatus, which can record high quality image having less bleeding by calculating a density of a character to be recorded based on information of a type, size, and line width of the character to be recorded, and adjusting an irradiation energy of the laser beam according to the density, and can attain durability against repeated use in the case of using a thermoreversible recording medium.

Means for solving the problems are as follows.

<1> An image processing method containing: calculating a density of a character to be recorded based on information of a type, size and line width of the character; adjusting an irradiation energy of a laser beam for recording the character based on the density of the character; and irradiating a recording medium with the laser beam whose irradiation energy is adjusted so as to record the character thereon.

<2> The image processing method according to <1>, wherein the calculating contains obtaining an entire length of a drawing line based on the size and type of the character to be recorded, and dividing a product of the entire length of the drawing line and the line width of the character by the size of the character, so as to calculate the density of the character to be recorded.

<3> The image processing method according to any one of <1> and <2>, wherein the adjusting contains adjusting an irradiation energy of a laser beam for a low density of the character to be recorded to be higher than an irradiation energy of a laser beam for a high density of the character to be recorded.

<4> The image processing method according to any one of <1> to <3>, wherein the adjusting contains adjusting an irradiation power of the laser beam to adjust the irradiation energy of the laser beam.

<5> The image processing method according to any one of <1> to <3>, wherein the adjusting contains adjusting a scanning speed of the laser beam to adjust the irradiation energy of the laser beam.

<6> The image processing method according to any one of <1> to <5>, further containing operating the laser beam so as not to irradiate an overlapped portion of the character with the laser beam more than once.

<7> The image processing method according to any one of <1> to <6>, wherein the calculating containing selecting font data of the character to be used based on the information of the size and the line width of the character to be recorded, and calculating the density based on the selected font data.

<8> The image processing method according to any one of <1> to <7>, wherein a laser beam source used in the irradiating is at least one selected from a YAG laser beam source, a fiber laser beam source, and a semiconductor laser beam source.

<9> The image processing method according to any one of <1> to <8>, wherein the laser beam used in the irradiating has a wavelength of 700 nm to 1,500 nm.

<10> The image processing method according to any one of <1> to <9>, wherein the recording medium contains a support and at least a first thermoreversible recording layer, a photothermal conversion layer containing a photothermal conversion material which absorbs light having a specific wavelength and converts the light into heat, and a second thermoreversible recording layer in this order over the support; and both the first thermoreversible recording layer and the second thermoreversible recording layer reversibly change in color tone depending on temperature.

<11> The image processing method according to <10>, wherein the first thermoreversible recording layer and the second thermoreversible recording layer individually contain a leuco dye and a reversible developer.

<12> The image processing method according to any one of <10> and <11>, wherein the photothermal conversion material is a material having an absorption peak in the near-infrared region.

<13> The image processing method according to <12>, wherein the photothermal conversion material is a phthalocyanine-based compound.

<14> The image processing method according to <12>, wherein the photothermal conversion material is an inorganic material.

<15> An image processing apparatus containing: a laser beam emitting unit configured to emit a laser beam; and an optical scanning unit configured to scan a laser-beam exposing surface with the laser beam, wherein the image processing apparatus is used for the image processing method according to any one of <1> and <14>.

The present invention solves the conventional problems, and can achieve the object, and can provide an image processing method and an image processing apparatus, which can record high quality image having less bleeding by calculating a density of a character to be recorded based on information of a type, size, and line width of the character to be recorded, and adjusting an irradiation energy of the laser beam according to the density, and can attain durability against repeated use in the case of using a thermoreversible recording medium.

Figure 1:
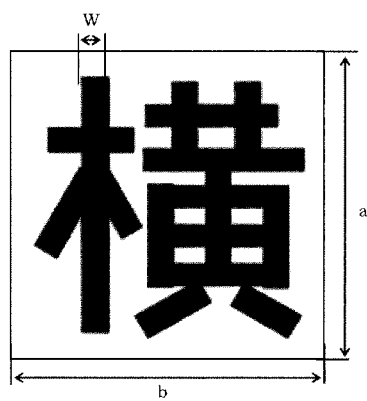
FIG. 1 is an example of a diagram for explaining a calculation method of a density of a character.

DETAILED DESCRIPTION OF THE INVENTION (Image Processing Method)

The image processing method of the present invention includes at least a density calculating step, and an image recording step, further includes a step of non-overlapping treatment of overlapped portion, and an image erasing step, and if necessary includes other steps.

<Density Calculating Step>

The density calculating step is a step of calculating a density of a character to be recorded based on information of a type, size and line width of the character to be recorded.

The information of the type, size and line width of the character to be recorded may be provided by inputting the information by a user.

Examples of the type of the character include Chinese characters (Kanjis), Katakanas, numbers, alphabets, symbols, diagrams (such as logos, bar codes), outline characters, and reversed characters.

In the method in which a recording medium is irradiated with a laser beam, and an irradiated part thereof is heated, modified, or deformed with an irradiation energy of the laser beam, so as to record desired characters, images, etc., various characters and images are recorded. Thus, various characters having different types, sizes, and line widths are recorded, and various images having different types and sizes are recorded. As a result, there are variations in densities of characters. Namely, in the case where the line width is thick with respect to the size of the character, or in the case where a total length of a drawing line to be shown is long, for example, provided that the characters "一" and "横" are the same in size, the total length of the drawing line of the character "横" is longer than that of the character "一", an area to be recorded increases and the density becomes high.

As the recording medium, either a thermal recording medium on which image recording is performed once, or a thermoreversible recording medium on which image recording and erasing are repeatedly performed, can be suitably used.

Using a laser marker (laser irradiation recording device), as shown in FIG. 1, a size of a character can be changed by specifying a length of a character in a height direction "a" and a length of the character in a width direction "b". A character is recorded within a square frame defined by specifying "a" and "b", using font data for the character. Here, the recordation using the laser marker is performed so as to record the character, but not to record the square frame.

As shown in FIG. 1, a size of a character is determined by (a×b), where "a" denotes a length of the character in a height direction, "b" denotes a length of the character in a width direction, and a density of a character can be defined by S/(a×b), where "S" denotes an area of the character.

Generally, using a laser maker (laser irradiation recording device), a character can be recorded with changing its size by setting the character size (a length of a height direction "a"×a length of a width direction "b"). Thus, in the definition of the density, the character size set in the laser marker corresponds to (a×b) as described above.

The area of the character S varies depending on the size (a×b), the line width W, and the type of the character. The value of the area S changes substantially in proportion to the entire length L of the drawing line, based on the line width W of the character, the type of the character and the size (a×b) of the character, provided that "a" and "b" change with equal ratios. Therefore, the entire length L of the drawing line is obtained from the size (a×b) and type of the character, and then a product of the entire length L of the drawing line and the line width W is divided by the size (a×b) of the character, to thereby calculate a density of a character to be recorded.

Specifically, the entire length L of the drawing line can be computed with a laser marker by the following manner. Using the laser marker, a type, size and printing position of a character set by a user is converted into a coordinate, and then the position of the coordinate is converted into an angle of a scanning mirror. Thereafter, with the laser marker the angle is controlled so as to scan a desired position with a laser beam, to thereby perform printing. Using data of the coordinate positions, distances between the coordinates are calculated, followed by summing the distances, to thereby calculate an entire length L of the drawing line. For example, a distance Li between a coordinate A (X1, Y1) and a coordinate B (X2, Y2) can be obtained from the formula $\sqrt{(X1-X2)^2+(Y1-Y2)^2}$. The distances between coordinates are summed, i.e., $\Sigma Li$, to thereby obtain the entire length L of the drawing line.

In the recording with a laser marker (laser irradiation recording device), the types of the characters include Chinese characters. Thus, various characters having different entire lengths L of the drawing lines are used. Moreover, to emphasize a recorded character, the line width W and the size (a×b) of the character are changed. As a result, characters with various densities are recorded on a recording medium.

When recording is performed with a laser beam, a recording medium adsorbs the laser beam, the laser beam is converted into heat, and then the recording medium is locally heated, modified, deformed, or the like, to thereby record desired characters, images, etc. However, there is influence of irradiation of a laser beam in an adjacent part, where a space between drawing lines is narrow in one character, because of influence of heat accumulation due to dispersion of heat. Namely, immediately after the adjacent part is irradiated with a laser beam, excessive heat is applied, compared to the case where the adjacent part is not irradiated. Consequently, application of excessive heat causes a thick drawing line, and fineness of a character decreases. The application of excessive heat causes damage to a thermoreversible recording medium on which image recording and erasing can be repeatedly performed, causing decrease in durability against repeated use. In a conventional system, the uniform irradiation energy is used regardless of the type, size, and line width of a character, and the entire irradiation energy is adjusted for recording. However, an adjusting width is narrow and it is difficult to adjust the irradiation energy, causing decrease in image quality and durability against repeated use.

In the present invention, the density calculating step is preferably includes selecting font data of a character to be used based on information of a size and a line width of the character to be recorded, and calculating the density based on the selected font data.

As the font data, at least vector font data is necessary for a laser marker. In addition, examples of the font data include font data for a character, in which an interval between lines is adjusted to be constant in the character, in order to improve visibility using single stroke font data; font data for a small size character, in which the character is partly removed; font data for a character, in which an overlapped portion is removed in an intersection or folding-back section; and outline font data for forming an outline character.

Figure 7A:
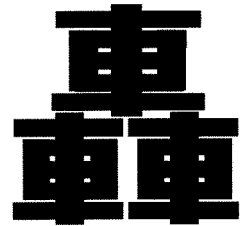
FIG. 7A is an example of a diagram showing a character having many stroke counts and a high density.
Figure 7B:
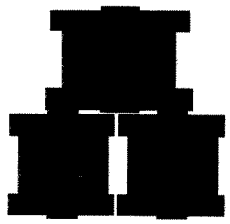
FIG. 7B is an example of a diagram showing a character having a high density and a thick line width.
Figure 7C:
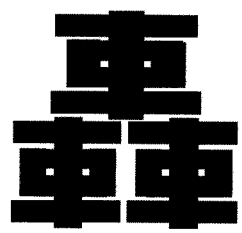
FIG. 7C is an example of a diagram showing a character for a font for a small size character with respect to the character having a high density and a thick line width.

The density calculating step and the step of selecting font data of a character to be used are combined, so as to further improve the effect of the present invention. That is, as shown in FIG. 7A, an example of a character having many stroke counts and a high density is explained with reference to "轟". When the line width of "轟" is thickened, the character is painted out as shown in FIG. 7B, causing degradation of visibility. Thus, font data for small size characters, in which the characters are partly removed, are installed in an image processing apparatus in advance, and based on information of a size and line width of a character, the font data for the small size character is selected, to thereby solve the problems of the visibility, as shown in FIG. 7C.

Use of font data for the small size character is determined as follows. When an interval between the center lines of lines of a character is small relative to the line width thereof, particularly, the interval is smaller than the line width, the font data for the small size character is selected.

It is preferred that after the font data for the small size character is used, the density calculating step be performed so as to calculate a density of a character to be recorded, and thereafter an image recording step, which will be described below, is performed.

<Image Recording Step>

The image recording step is a step of adjusting an irradiation energy of a laser beam for recording a character based on the density of the character; and thereafter irradiating a recording medium with the laser beam whose irradiation energy is adjusted so as to record the character thereon.

The inventors of the present invention have intensively studied, and found as a result of performing image recording by changing densities of characters depending on various types, sizes (a×b), and line widths W of the characters, that irradiation energy suitable for recording, i.e., suitable for recording contrast, fineness, and durability against repeated use, can be indicated by function of density and the irradiation energy. However, the relation of the density and the irradiation energy does not depend on the type, size (a×b), and line width W of a character.

The relation between the density of a character to be recorded and suitable irradiation energy of a laser beam for recording the character varies depending on a material of a recording material, and environmental temperature, etc. Specifically, in the case of a medium used in Example below in an environment at 25° C., a printing density D and a suitable irradiation energy E are expressed by a linear function $E=E0*(1-0.22*D)$, where E0 denotes an irradiation energy when the printing density D is 1. A coefficient of inclination changes according to a material of a recording medium, and environmental temperature. In the case of a recording medium used in Examples below, the coefficient of inclination is 0.22.

The line width W varies according to the state of heat accumulation. Here, the line width W is a width of a line which is not adjacent to another line, and recorded without correction of irradiation energy.

The decrease in fineness of a character, and durability against repeated use can be suppressed by adjusting the irradiation energy of the laser beam upon recording, depending on a density of a character determined by the type, size (a×b) and line width W of the character. For example, this can be achieved by decreasing the irradiation energy of the laser beam upon recording when a character having high density is recorded. In the present invention, in the case where the density of the character is high, the irradiation energy of the laser beam upon recording is decreased, and then printing is performed with suitable irradiation energy, in order to prevent application of excessive energy while the printing is performed in the state of heat accumulation.

In the image processing method of the present invention, based on information relating to recording, such as a type, size (a×b), and line width W of a character, for example, input by a user, a density of the character to be recorded is calculated by processing in a laser marker device, and then the irradiation energy of the laser beam to be recorded is changed, depending on the density of the character.

A thick line width W can be printed by changing the line width of a character, such as changing a diameter of a laser beam, or recording a plurality of drawing lines side by side with substantially moving a laser beam according to a line width. In the present invention, change of a diameter of the laser beam due to the change of an operation distance, i.e., a distance between the recording medium and an optical head surface of the LD marker in which fθ is arranged, can be optically achieved. However, change of a diameter of the laser beam due to the operation distance can be easily changed by changing a distance between a condenser lens and a recording medium.

Since the irradiation energy of the laser beam is proportional to P/V (where, P denotes an irradiation power of a laser beam on a medium, and V denotes a scanning speed of the laser beam on the recording medium), it is preferred that at least one of the scanning speed V of the laser beam and the irradiation power P be controlled so as to obtain substantially constant P/V.

A method of controlling the scanning speed of the laser beam may be suitably selected in accordance with the intended use without any restrictions. Examples thereof include a method of controlling a rotational speed of a motor for operation of a scanning mirror. The speed of the motor can be controlled by changing a speed value set for the motor depending on portions, such as a starting point portion and a bend portion, where the rotational speed of the motor is difficult to control, and a linear portion. However, when the starting point portion is recorded, it takes time until the rotational speed reaches a desired speed from 0. In such a case, it is necessary to adjust the irradiation power and/or a timing of irradiation, namely, a laser beam is irradiated upon reaching a desired speed.

A method of controlling the irradiation power of the laser beam may be suitably selected in accordance with the intended use without any restrictions. Examples thereof include a method of changing a set value of the irradiation power of the laser beam, and a method of adjusting pulses of duration in the case of a laser for plus irradiation.

Examples of the method of changing a set value of the irradiation power of the laser beam include a method of changing a set value of the irradiation power according to a density of a character. As the method of adjusting pulses of duration, the irradiation energy can be adjusted with the irradiation power by changing duration of pulse emission according to a density of a character.

The output power of the laser beam irradiated in the image recording step may be suitably selected in accordance with the intended use without any restriction. It is preferably 1 W or higher, more preferably 3 W or higher, and still more preferably 5 W or higher. When the output power is lower than 1 W, it takes time to record an image, and if an attempt is made to shorten the image recording time, the output power becomes insufficient. The upper limit of the output power of the laser beam may be suitably selected in accordance with the intended use without any restriction. It is preferably 200 W or lower, more preferably 150 W or lower, and still more preferably 100 W or lower. When the upper limit is higher than 200 W, the laser marker may become larger in size.

The scanning speed of the laser beam irradiated in the image recording step may be suitably selected in accordance with the intended use without any restriction. It is preferably 300 mm/s or higher, more preferably 500 mm/s or higher, and still more preferably 700 mm/s or higher. When the scanning speed is lower than 300 mm/s, it takes time to record an image. Also, the upper limit of the scanning speed of the laser beam may be suitably selected in accordance with the intended use without any restrictions. It is preferably 15,000 mm/s or lower, more preferably 10,000 mm/s or lower, and still more preferably 8,000 mm/s or lower. When the upper limit is higher than 15,000 mm/s, it becomes difficult to record a uniform image.

The spot diameter of the laser beam irradiated in the image recording step may be suitably selected in accordance with the intended use without any restriction. It is preferably 0.02 mm or greater, more preferably 0.1 mm or greater, and still more preferably 0.15 mm or greater. The upper limit of the spot diameter of the laser beam may be suitably selected in accordance with the intended use without any restriction. It is preferably 3.0 mm or smaller, more preferably 2.5 mm or smaller, and still more preferably 2.0 mm or smaller.

When the spot diameter is excessively small, the line width of a resulting image decreases, and the visibility degrades. When the spot diameter is excessively large, the line width of a resulting image increases, adjacent lines are overlapped, and it becomes impossible to record a small-size image. The source of the laser beam is not particularly limited, however, it is preferably at least one selected from a YAG laser beam source, a fiber laser beam source, and a semiconductor laser beam source.

<Step of Non-Overlapping Treatment of Overlapped Portion>

The step of non-overlapping treatment of overlapped portion is a step of operating the laser beam so as not to irradiate an overlapped portion of a character with a laser beam more than once.

The step of non-overlapping treatment of overlapped portion is performed in such a manner that, specifically, when an image having an overlapped portion, in which a plurality of drawing lines constituting a character are overlapped, is recorded, each of the drawing lines in the overlapped portion are discontinuously recorded.

When the drawing lines in the overlapped portion are continuously recorded, for example, in the case where the overlapped portion is bent, it is difficult to instantaneously change an angle of a mirror operated with a motor. Thus, the scanning speed of the laser beam slows down, and excessive energy is applied to the bend portion, i.e., overlapped portion, and a thermoreversible recording medium may be locally damaged by repeatedly performing image recording and erasing.

Examples of an embodiment in which drawing lines are continuously recorded in the overlapped portion include an embodiment, in which an end portion of a drawing line and a staring portion of a drawing line are recorded, so as to overlap each other.

Here, discontinuous recording means that a plurality of drawing lines are individually recorded with interruption of laser beam irradiation while a plurality of drawing lines are recorded by laser beam irradiation. Specifically, examples of the discontinuous recording include (1) an embodiment that an end point of a drawing line and an end point of a drawing line are recorded so as to overlap each other in the overlapped portion, (2) an embodiment that a starting point of a drawing line and a starting point of a drawing line are recorded so as to overlap each other in the overlapped portion, (3) an embodiment that a starting point of a drawing line and a position other than a starting and an end point, for example, an intermediate point of a drawing line are recorded so as to overlap each other in the overlapped portion, (4) an embodiment that an end point of a drawing line and a position other than a starting point and an end point, for example, an intermediate point of a drawing line are recorded so as to overlap each other in the overlapped portion, and combinations of these embodiments.

<Image Processing Apparatus>

The image processing apparatus is used for the image processing method of the present invention, and includes at least a laser beam emitting unit and an optical scanning unit configured to scan a laser-beam exposing surface with the laser beam, and if necessary, further includes appropriately selected other units. Additionally, in the present invention, there is a need to select a wavelength of a laser beam emitted therefrom so that the laser beam is highly efficiently absorbed into a medium on which an image is recorded. For example, a recording medium according to the present invention contains at least a photothermal conversion material having a roll of absorbing a laser beam with high efficiency and generating heat. Therefore, a wavelength of a laser beam emitted therefrom is preferably selected so as to absorb the photothermal conversion material the laser beams with the highest efficiency as compared with other materials.

—Laser Beam Emitting Unit—

The wavelength of a laser beam emitted from the laser beam emitting unit is preferably 700 nm or more, more preferably 720 nm or more, still more preferably 750 nm or more. The upper limit of the wavelength of the laser beam can be suitably selected in accordance with the intended use. It is preferably 1,500 nm or less, more preferably 1,300 mm or less, still more preferably 1,200 nm or less.

When the wavelength of the laser beam is shorter than 700 nm, there are problems that in a visible light wavelength region, the contrast of an image decreases when the image is recorded on a medium, and the recording medium is colored. In an ultraviolet wavelength region with a wavelength much shorter than the wavelength described above, the medium tends to deteriorate. To ensure high durability against repeated image processing, the photothermal conversion material to be added into a recording medium is required to have a high thermal decomposition temperature, and when an organic dye is used in the photothermal conversion material, it is difficult to obtain a photothermal conversion material having a high decomposition temperature and a long light absorption wavelength. For this reason, the wavelength of the laser beam is preferably 1,500 nm or less.

The laser beam emitting unit may be suitably selected depending on the intended purpose. Examples thereof include YAG lasers, fiber lasers, and semiconductor lasers (LD). Of these, the semiconductor lasers are particularly preferably used, in terms that its wide selectivity of wavelength increases choices of the photothermal conversion material, and that a laser beam source itself is small, thereby achieving downsizing of the device and price-reduction as a laser device.

The image processing apparatus has a basic configuration similar to that of a so-called laser marker, except that it has at least the laser beam emitting unit. For example, the image processing apparatus includes at least an oscillator unit, a power source controlling unit and a program unit.

Figure 2:
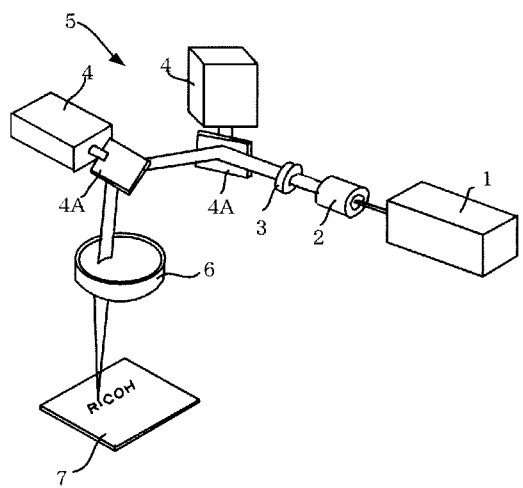
FIG. 2 is an example of a diagram for explaining a structure of a laser maker used in the present invention.

Here, one example of the image processing apparatus is shown in FIG. 2, with focusing on a laser irradiation unit.

An oscillator unit includes a laser oscillator 1, a beam expander 2, a scanning unit 5, and the like.

The laser oscillator 1 is the one required for obtaining a laser beam having high light intensities and high directivity. For example, mirrors are disposed at both sides of a laser medium, and the laser medium is pumped (energy-supplied) to increase the number of atoms in an excited state and form an inverted distribution, thereby bringing about induced emission of laser beams. Then, by selectively amplifying only light beams traveling in an optical axis direction, the directivity of light beams is increased and the laser beams are emitted from an output mirror.

The scanning unit 5 includes a galvanometer 4 and mirrors 4A attached to the galvanometer 4. A laser beam emitted from the laser oscillator 1 is scanned with high speed rotation over a scanning region of a thermoreversible recording medium 7 with the two mirrors A4 each of which is attached to the galvanometer 4 and faces in one of an X direction and an Y direction, whereby an image is recorded or erased on the thermoreversible recording medium 7.

The power source controlling unit includes a driving electrical power supply for a light source exciting a laser medium, a driving electrical power supply for galvanometer, a power source for cooling such as Peltier device, a controlling section which controls overall operations of the image processing apparatus, and the like.

The program unit is a unit which inputs conditions of the intensity of a laser beam, speed of laser scanning, etc. and creates and edits characters etc. to be recorded, for recording or erasing an image, by inputting data in a touch panel or a keyboard.

The laser irradiation unit, namely, an image recording/erasing head section is loaded on the image processing apparatus, and the image processing apparatus includes, in addition to this unit, a conveying section for conveying the thermoreversible recording medium, a controlling section therefor, a monitoring section (touch panel), and the like.

—Image Erasing Step—

When image recording is performed on the thermoreversible recording medium as a recording medium, an image erasing step may be provided, which is a step of erasing an image recorded on the thermoreversible recording medium by heating the thermoreversible recording medium, on which the image has been recorded.

A method of heating the thermoreversible recording medium is not particularly limited, and examples there of include conventionally known heating methods, for example, non-contact heating method such as irradiation with a laser beam, hot air, warm water, infrared ray heater; and contact heating methods such as thermal head, hot stamp, heat block, heat roller. When assuming a physical distribution line, the method of heating a thermoreversible recording medium through irradiation with a laser beam is preferred in that the recorded image can be erased in noncontact with the thermoreversible recording medium.

The output power of the laser beam irradiated to the thermoreversible recording medium in the image erasing step may be suitably selected in accordance with the intended use without any restriction. It is preferably 5 W or higher, more preferably 7 W or higher, and still more preferably 10 W or higher. When the output power of the laser beam is lower than 5 W, it takes time to erase an image, and if an attempt is made to shorten the image recording time, the output power becomes insufficient, causing image erasing failure. The upper limit of the output power of the laser beam may be suitably adjusted in accordance with the intended use without any restriction. It is preferably 200 W or lower, more preferably 150 W or lower, and still more preferably 100 W or lower. When the output power of the laser beam is higher than 200 W, the laser device may become larger in size.

The scanning speed of the laser beam irradiated to the thermoreversible recording medium in the image erasing step may be suitably selected in accordance with the intended use without any restriction. It is preferably 100 mm/s or higher, more preferably 200 mm/s or higher, and still more preferably 300 mm/s or higher. When the scanning speed is lower than 100 mm/s, it takes time to erase the recorded image. Also, the upper limit of the scanning speed of the laser beam may be suitably selected in accordance with the intended use without any restrictions. It is preferably 20,000 mm/s or lower, more preferably 15,000 mm/s or lower, and still more preferably 10,000 mm/s or lower. When the scanning speed is higher than 20,000 mm/s, it becomes difficult to erase the recorded image uniformly.

The source of the laser beam irradiated in the image erasing step is not particularly limited, however, it is preferably at least one selected from a YAG laser beam source, a fiber laser beam source, and a semiconductor laser beam source.

The spot diameter of the laser beam irradiated to the thermoreversible recording medium in the image erasing step may be suitably selected in accordance with the intended use without any restriction. It is preferably 0.5 mm or greater, more preferably 1.0 mm or greater, and still more preferably 2.0 mm or greater. The upper limit of the spot diameter of the laser beam may be suitably selected in accordance with the intended use without any restriction. It is, however, preferably 14.0 mm or smaller, more preferably 10.0 mm or smaller, and particularly preferably 7.0 mm or smaller.

When the spot diameter is excessively small, it takes time to erase the recorded image. When the spot diameter is excessively large, the output power becomes insufficient, causing image erasing failure.

<Recording Medium>

As the recording medium, both a recording medium on which image recording is performed once, and a thermoreversible recording medium on which image recording and erasing are repeatedly performed, can be suitably used in the present invention.

As the recording medium for one recording, a thermal recording medium (thermal recording paper), plastic such as polypropylene, a semiconductor, a metal, etc. are used, and the medium is irradiated with a laser beam, and then absorb the laser beam so as to generate heat, followed by modification, deformation, and removal by heat, to thereby perform printing. When a character having high density is printed on thermal recording paper, plastic, and a semiconductor, the character is painted out due to heat accumulation caused by dispersion of heat, and visibility degrades, similar to the case where the character is recorded on the thermoreversible recording medium. The visibility of the character can be improved by control according to the present invention.

The thermal recording medium used in the present invention includes a support, and a thermosensitive recording layer formed on a surface of the support, and preferably further includes a photothermal conversion layer, an oxygen barrier layer, an ultraviolet absorbing layer, an intermediate layer, a protective layer, and if necessary, other layers such as an undercoat layer, a back layer, an adhesive layer, a tackiness layer, a coloring layer, an air layer, and a light reflective layer. Each of these layers may be formed in a single layer structure or a multi-layered structure.

<<Thermoreversible Recording Medium>>

The thermoreversible recording medium may be suitably selected in accordance with the intended use without any restriction. The thermoreversible recording medium preferably includes a support, a first thermoreversible recording layer, a photothermal conversion layer, and a second thermoreversible recording layer in this order over the support, and further includes other layers suitably selected as required such as a first oxygen barrier layer, a second oxygen barrier layer, an ultraviolet absorbing layer, a back layer, a protective layer, an intermediate layer, an undercoat layer, an adhesive layer, a tackiness layer, a coloring layer, an air layer, and a light reflective layer. Each of these layers may be formed in a single layer structure or a multi-layered structure, provided that as for layers which are provided over the photothermal conversion layer, in order to reduce energy loss of a laser beam with a specific wavelength irradiated, each of them preferably formed of a material of less absorbing light of the specific wavelength.

Figure 3A:
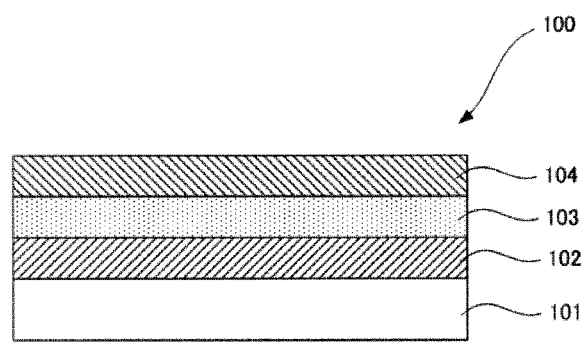
FIG. 3A is a schematic cross-sectional diagram showing an example of a layer configuration of a thermoreversible recording medium of the present invention.

Here, the layer configuration of a thermoreversible recording medium 100 is not particularly limited, for example, as shown in FIG. 3A, an embodiment of the layer configuration is such that the thermoreversible recording medium 100 has a support 101, and a first thermoreversible recording layer 102, a photothermal conversion layer 103, and a second thermoreversible recording layer 104 in this order over the support 101.

Figure 3B:
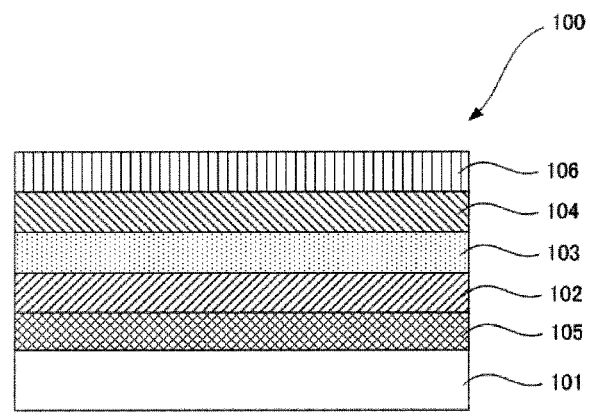
FIG. 3B is a schematic cross-sectional diagram showing another example of the layer configuration of the thermoreversible recording medium of the present invention.

Further, as shown in FIG. 3B, another embodiment of the layer configuration is such that a thermoreversible recording medium 100 has a support 101, a first oxygen barrier layer 105, a first thermoreversible recording layer 102, a photothermal conversion layer 103, a second thermoreversible recording layer 104, and a second oxygen barrier layer 106 in this order over the support 101.

Figure 3C:
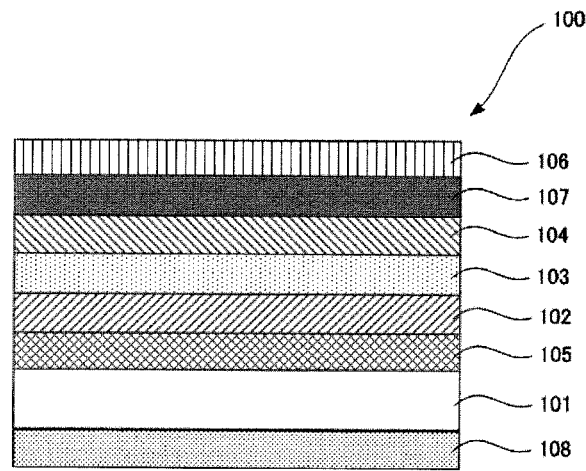
FIG. 3C is a schematic cross-sectional diagram showing yet another example of the layer configuration of the thermoreversible recording medium of the present invention.

Furthermore, as shown in FIG. 3C, yet another embodiment of the layer configuration is such that a thermoreversible recording medium 100 has a support 101, a first oxygen barrier layer 105, a first thermoreversible recording layer 102, a photothermal conversion layer 103, a second thermoreversible recording layer 104, an ultraviolet absorbing layer 107, a second oxygen barrier layer 106 in this order over the support 101, and further has a back layer 108 on the surface of the support 101, which surface is opposite to the surface over which the first and second thermoreversible recording layers and the like are formed.

Note that although illustration is omitted, a protective layer may be formed on the second thermoreversible recording layer 104 in FIG. 3A, on the second oxygen barrier layer 106 in FIG. 3B, and the second oxygen barrier layer 106 in FIG. 3C, each of these protective layers serving as an uppermost surface layer.

—Support—

The shape, structure, size and the like of the support are suitably selected in accordance with the intended use without any restriction. Examples of the shape include plate-like shapes; the structure may be a single layer structure or a laminated structure; and the size may be suitably selected according to the size of the thermoreversible recording medium, etc.

Examples of the material for the support include inorganic materials and organic materials.

Examples of the inorganic materials include glass, quartz, silicon, silicon oxide, aluminum oxide, $SiO_2$ and metals.

Examples of the organic materials include paper, cellulose derivatives such as cellulose triacetate, synthetic paper, and films made of polyethylene terephthalate, polycarbonates, polystyrene, polymethyl methacrylate, etc.

Each of the inorganic materials and the organic materials may be used alone or in combination. Among these materials, the organic materials are preferable, specifically films made of polyethylene terephthalate, polycarbonates, polymethyl methacrylate, etc. are preferable. Of these, polyethylene terephthalate is particularly preferable.

It is desirable that the support be subjected to surface modification by means of corona discharge, oxidation reaction (using chromic acid, for example), etching, facilitation of adhesion, antistatic treatment, etc. for the purpose of improving the adhesiveness of a coating layer.

Also, it is desirable to color the support white by adding, for example, a white pigment such as titanium oxide to the support.

The thickness of the support is suitably selected in accordance with the intended use without any restriction, with the range of 10 μm to 2,000 μm being preferable and the range of 50 μm to 1,000 μm being more preferable.

—First Thermoreversible Recording Layer and Second Thermoreversible Recording Layer—

The first thermoreversible recording layer and the second thermoreversible recording layer reversibly change in color tone by heat. Each of the first and second thermoreversible recording layer (which may be hereinafter referred to as a "thermoreversible recording layer") includes a leuco dye serving as an electron-donating color-forming compound, a developer serving as an electron-accepting compound, and a binder resin, and, if necessary, further includes other components.

The leuco dye serving as an electron-donating color-forming compound and a reversible developer serving as an electron-accepting compound, in which color tone reversibly changes by heat, are materials capable of exhibiting a phenomenon in which visible changes are reversibly produced by temperature change; and the material can relatively change into a colored state and into a decolored state, depending upon the heating temperature and the cooling rate after heating.

—Leuco Dye—

The leuco dye itself is a colorless or pale dye precursor. The leuco dye is not particularly limited and may be suitably selected from known leuco dyes. Preferred examples thereof include leuco compounds based on triphenylmethane phthalide, triallylmethane, fluoran, phenothiazine, thiofluoran, xanthene, indophthalyl, spiropyran, azaphthalide, chromenopyrazole, methines, rhodamineanilinolactam, rhodaminelactam, quinazoline, diazaxanthene and bislactone. Among these, fluoran-based and phthalide-based leuco dyes are particularly preferable in that they are excellent in coloring and decoloring properties, color and storage stability. These may be used alone or in combination, and the thermoreversible recording medium can be made suitable for multicolor or full-color recording by providing a layer which color forms with a different color tone.

—Reversible Developer—

The reversible developer is suitably selected in accordance with the intended use without any restriction, provided that it is capable of reversibly developing and erasing color by means of heat. Suitable examples thereof include a compound having in its molecule at least one of the following structures: a structure (1) having such a color-developing ability as makes the leuco dye develop color (e.g., a phenolic hydroxyl group, a carboxylic acid group, a phosphoric acid group, etc.); and a structure (2) which controls cohesion among molecules (e.g., a structure in which long-chain hydrocarbon groups are linked together). In the linked site, the long-chain hydrocarbon group may be linked via a divalent or higher linking group containing a hetero atom. Additionally, the long-chain hydrocarbon groups may contain at least either similar linking groups or aromatic groups.

For the structure (1) having such a color-developing ability as makes the leuco dye develop color, phenol is particularly suitable.

For the structure (2) which controls cohesion among molecules, long-chain hydrocarbon groups having 8 or more carbon atoms are preferable, 11 or more carbon atoms are more preferable, and the upper limit of the number of carbon atoms is preferably 40 or less, more preferably 30 or less.

Among the reversible developers, a phenol compound represented by General Formula 1 is preferable, and a phenol compound represented by General Formula 2 is more preferable.

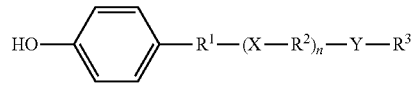

General Formula 1

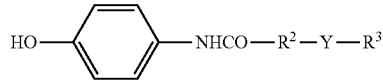

General Formula 2

In General Formulae 1 and 2, $R^1$ denotes a single bond or an aliphatic hydrocarbon group having 1 to 24 carbon atoms. $R^2$ denotes an aliphatic hydrocarbon group having 2 or more carbon atoms, which may have a substituent, and the number of the carbon atoms is preferably 5 or greater, more preferably 10 or greater. $R^3$ denotes an aliphatic hydrocarbon group having 1 to 35 carbon atoms, and the number of the carbon atoms is preferably 6 to 35, more preferably 8 to 35. Each of these aliphatic hydrocarbon groups may be provided alone or in combination.

The sum of the numbers of carbon atoms included in $R^1$, $R^2$ and $R^3$ is suitably selected in accordance with the intended use without any restriction, with its lower limit being preferably 8 or greater, more preferably 11 or greater, and the upper limit being preferably 40 or less, more preferably 35 or less.

When the sum of the numbers of carbon atoms is less than 8, coloring stability or decoloring ability may degrade.

Each of the aliphatic hydrocarbon groups may be a straight-chain group or a branched-chain group and may have an unsaturated bond, with preference being given to a straight-chain group. Examples of the substituent bonded to the aliphatic hydrocarbon group include a hydroxyl group, a halogen atom and an alkoxy group.

In General Formulae 1 and 2, X and Y may be identical or different, each representing an N atom-containing or O atom-containing divalent group. Specific examples thereof include an oxygen atom, amide group, urea group, diacylhydrazine group, diamide oxalate group and acylurea group, with amide group and urea group being preferable.

In General Formulae 1 and 2, "n" is an integer of 0 to 1.

The electron-accepting compound (developer) is not particularly limited, however, it is desirable that the electron-accepting compound be used together with a compound as a color erasure accelerator having in its molecule at least one of —NHCO— group and —OCONH— group because intermolecular interaction is induced between the color erasure accelerator and the developer in a process of producing a decolored state, thereby improving the coloring and decoloring properties.

The color erasure accelerator is suitably selected in accordance with the intended use without any restriction.

For the thermoreversible recording layer, a binder resin and, if necessary, additives for improving or controlling the coating properties and coloring and decoloring properties of the thermoreversible recording layer may be used. Examples of these additives include a surfactant, a conductive agent, a filling agent, an antioxidant, a light stabilizer, a coloring stabilizer and a color erasure accelerator.

—Binder Resin—

The binder resin is suitably selected in accordance with the intended use without any restriction, provided that it enables the thermoreversible recording layer to be bonded onto the support. For instance, one of conventionally known resins or a combination of two or more thereof may be used for the binder resin. Among these resins, resins capable of being cured by heat, an ultraviolet ray, an electron beam or the like are preferable in that the durability against repeated use can be improved, with particular preference being given to thermally curable resins each containing an isocyanate compound or the like as a cross-linking agent.

Examples of the thermally curable resins include a resin having a group which reacts with a cross-linking agent, such as a hydroxyl group or carboxyl group, and a resin produced by copolymerizing a hydroxyl group-containing or carboxyl group-containing monomer and other monomers.

Specific examples of such thermally curable resins include phenoxy resins, polyvinyl butyral resins, cellulose acetate propionate resins, cellulose acetate butyrate resins, acrylpolyol resins, polyester polyol resins and polyurethane polyol resins, with particular preference being given to acrylpolyol resins, polyester polyol resins and polyurethane polyol resins.

The mixture ratio (mass ratio) of the color former to the binder resin in the thermoreversible recording layer is preferably in the range of 1:0.1 to 1:10. When the amount of the binder resin is too small, the recording layer may be deficient in thermal strength. When the amount of the binder resin is too large, it is problematic because the coloring density decreases.

The cross-linking agent is suitably selected in accordance with the intended use without any restriction, and examples thereof include isocyanates, amino resins, phenol resins, amines and epoxy compounds. Among these, isocyanates are preferable, and polyisocyanate compounds each having a plurality of isocyanate groups are particularly preferable.

As to the amount of the cross-linking agent added relative to the amount of the binder resin, the ratio of the number of functional groups contained in the cross-linking agent to the number of active groups contained in the binder resin is preferably in the range of 0.01:1 to 2:1. When the amount of the cross-linking agent added is so small as to be outside this range, sufficient thermal strength cannot be obtained. When the amount of the cross-linking agent added is so large as to be outside this range, there is an adverse effect on the coloring and decoloring properties.

Further, as a cross-linking promoter, a catalyst utilized in this kind of reaction may be used.

The gel fraction of any of the thermally curable resins when thermally cross-linked is preferably 30% or more, more preferably 50% or more, and still more preferably 70% or more. When the gel fraction is less than 30%, an adequate cross-linked state cannot be produced, and thus the durability may degrade.

As to a method for distinguishing between a cross-linked state and a non-cross-linked state of the binder resin, these two states can be distinguished by immersing a coating film in a solvent having high dissolving ability, for example. Specifically, with respect to the binder resin in a non-cross-linked state, the resin dissolves in the solvent and thus does not remain in a solute.

The above-mentioned other components in the thermoreversible recording layer are suitably selected in accordance with the intended use without any restriction. For instance, a surfactant, a plasticizer and the like are suitable therefor in that recording of an image can be facilitated.

For a solvent, a coating solution dispersing device, a recording layer applying method, a drying and curing method and the like used for the thermoreversible recording layer coating liquid, those known in the art can be applied.

To prepare the thermoreversible recording layer coating liquid, materials may be together dispersed into a solvent using the dispersing device; alternatively, the materials may be independently dispersed into respective solvents and then the solutions may be mixed together. Further, the materials may be heated and dissolved, and then they may be precipitated by rapid cooling or slow cooling.

The method for forming the thermoreversible recording layer is suitably selected in accordance with the intended use without any restriction. Suitable examples thereof include a method (1) of applying onto a support a thermoreversible recording layer coating liquid obtained by dissolving or dispersing in a solvent the resin the leuco dye and the reversible developer, then cross-linking the coating solution while or after forming it into a sheet or the like by evaporation of the solvent; a method (2) of applying onto a support a thermoreversible recording layer coating liquid obtained by dispersing the leuco dye and the reversible developer in a solvent in which only the resin is dissolved, then cross-linking the coating solution while or after forming it into a sheet or the like by evaporation of the solvent; and a method (3) of not using a solvent and heating and melting the resin, the leuco dye and the reversible developer so as to mix, then cross-linking this melted mixture after forming it into a sheet or the like and cooling it. In each of these methods, it is also possible to produce the recording layer as a thermoreversible recording medium in the form of a sheet without using the support.

The solvent used in (1) or (2) cannot be unequivocally defined, as it is affected by the types, etc. of the resin, the leuco dye and the reversible developer. Examples thereof include tetrahydrofuran, methyl ethyl ketone, methyl isobutyl ketone, chloroform, carbon tetrachloride, ethanol, toluene and benzene.

Additionally, the reversible developer is present in the thermoreversible recording layer, with being dispersed in the form of particles.

A pigment, an antifoaming agent, a dispersant, a slip agent, an antiseptic agent, a cross-linking agent, a plasticizer and the like may be added into the thermoreversible recording layer coating liquid, for the purpose of exhibiting high performance as a coating material.

The coating method for the thermoreversible recording layer may be suitably selected in accordance with the intended use without any restriction. For instance, a support which is continuous in the form of a roll or which has been cut into the form of a sheet is conveyed, and the support is coated with the thermoreversible recording layer by a known method such as blade coating, wire bar coating, spray coating, air knife coating, bead coating, curtain coating, gravure coating, kiss coating, reverse roll coating, dip coating or die coating.

The drying conditions of the thermoreversible recording layer coating liquid are suitably selected in accordance with the intended use without any restriction. For instance, the thermoreversible recording layer coating liquid is dried at room temperature to a temperature of 140° C., for about 10 seconds to about 10 minutes.

The thickness of the thermoreversible recording layer is suitably selected in accordance with the intended use without any restriction. For instance, it is preferably 1 µm to 20 µm, more preferably 3 µm to 15 µm. When the thermoreversible recording layer is too thin, the contrast of an image may decrease because the coloring density lowers. When the thermoreversible recording layer is too thick, the heat distribution in the layer increases, a portion which does not reach a coloring temperature and so does not form color is created, and thus a desired coloring density may be unable to be obtained.

—Photothermal Conversion Layer—

The photothermal conversion layer contains at least a photothermal conversion material having a function to absorb a laser beam with high efficiency and generate heat. A barrier layer may be formed between the thermoreversible recording layer and the photothermal conversion layer for the purpose of inhibiting an interaction therebetween. The barrier layer is preferably formed by using a material having high thermal conductivity. The layer formed between the thermoreversible recording layer and the photothermal conversion layer is suitably selected in accordance with the intended use is not limited to the barrier layer.

The photothermal conversion material is broadly classified into inorganic materials and organic materials.

The inorganic materials are not particularly limited and examples thereof include carbon black, metals such as Ge, Bi, In, Te, Se, Cr, La and W or semi-metals thereof and alloys thereof. These are formed into a layer by vacuum deposition method, or adhesion of the materials in the form of particles using a resin or the like.

The organic materials are not particularly limited, and various dyes can be suitably used in accordance with the wavelength of a beam to be absorbed, and a near-infrared absorption pigment having an absorption peak within wavelengths of 700 nm to 1,500 nm is used, when a semiconductor laser is used as a light source. Specific examples thereof include cyanine pigments, quinone, quinoline derivatives of indonaphthol, phenylene diamine nickel complexes, and phthalocyanine pigments. To perform repeatedly image processing, it is preferable to select a photothermal conversion material that is excellent in heat resistance, with particular preference being given to phthalocyanine pigments.

Each of the near-infrared absorption pigments may be used alone or in combination.

When the photothermal conversion layer is formed, the photothermal conversion material is typically used in combination with a resin. The resin used in the photothermal conversion layer is suitably selected from those known in the art without any restriction, as long as it can maintain the inorganic material and the organic material therein, with preference being given to a thermoplastic resin, a thermally curable resin, and those similar to the binder resin used in the recording layer. Of these resins, resins curable with hest, an ultraviolet ray, an electron beam or the like are preferably used for improving the durability against repeated use, and a thermally cross-linkable resin using an isocyanate-based compound as a cross-linking agent is preferable. The hydroxyl value of the binder resin is preferably 50 mgKOH/g to 400 mgKOH/g.

The thickness of the photothermal conversion layer may be suitably selected in accordance with the intended use without particular restriction. It is preferably 0.1 µm to 20 µm.

—First Oxygen Barrier Layer and Second Oxygen Barrier Layer—

The first oxygen barrier layer and the second oxygen barrier layer (hereinafter, which may be otherwise referred to as "oxygen barrier layer") are provided for the purpose of preventing oxygen from entering the first and second thermoreversible recording layers, thereby preventing optical degradation of the leuco dye in the first and second thermoreversible recording layers. These oxygen barrier layers are preferably provided on and under the first and second thermoreversible recording layers. That is, it is preferable that the first oxygen barrier layer be provided between the support and the first thermoreversible recording layer, and the second oxygen barrier layer be provided on the second thermoreversible recording layer.

The first and second oxygen barrier layers have high permeability in the visible part of the spectrum, and thus as a material therefor, a resin having low oxygen permeability or a polymer film may be used. The material of the oxygen barrier layers are selected depending on the application use, the oxygen permeability, the transparency, the ease of coating, the adhesiveness, and the like.

Specific examples of the material for the oxygen barrier layers include resins such as polyacrylic alkyl ester, polymethacrylic alkyl ester, polymethacrylonitrile, polyvinyl alkyl ester, polyvinyl alkyl ether, polyvinyl fluoride, polystyrene, vinyl acetate copolymers, cellulose acetate, polyvinyl alcohol, polyvinylidene chloride, acetonitrile copolymers, vinylidene chloride copolymers, poly(chlorotrifluoroethylene), ethylene-vinyl alcohol copolymers, polyacrylonitrile, acrylonitrile copolymers, polyethylene terephthalate, nylon-6, and polyacetal; a silica-deposited film in which an inorganic oxide is vapor-deposited on a polymer film such as polyethylene terephthalate, and nylon; an alumina-deposited film; and a silica/alumina-deposited film. Among these, a film obtained by vapor-depositing an inorganic oxide on a polymer film is preferable.

The oxygen permeability of the oxygen barrier layers is preferably 20 mL/m$^2$/day/MPa or lower, more preferably 5 mL/m$^2$/day/MPa or lower, and still more preferably 1 mL/m$^2$/day/MPa or lower. When the oxygen permeability is higher than 20 mL/m$^2$/day/MPa, the leuco dye in the first and second thermoreversible recording layers may be suffered from optical degradation.

The oxygen permeability can be measured according to the measurement method described in JIS K7126 B.

The oxygen barrier layers can be formed so as to sandwich the thermoreversible recording layer, for example, one of the oxygen barrier layers is formed under the thermoreversible recording layer or on the back surface of the support. By disposing the oxygen barrier layer in this manner, the oxygen is efficiently prevented from entering the thermoreversible recording layer, and thus the photodeterioration of the leuco dye can be suppressed.

The method of forming the first and second oxygen barrier layers may be suitably selected in accordance with the intended use without any restriction. Examples thereof include melt extrusion methods, coating methods, and laminating methods.

The thickness of each of the first and second oxygen barrier layers is not particularly limited and varies depending on the oxygen permeability of the resin or polymer film used. The thickness is preferably 0.1 μm to 100 μm. When the thickness thereof is less than 0.1 μm, the oxygen barrier properties is imperfect, and when it is more than 100 μm, unfavorably the transparency degrades.

An adhesive layer may be provided between the oxygen barrier layer and an underlying layer which is provided under the oxygen barrier layer. The method of forming the adhesive layer is not particularly limited, and examples thereof include known coating methods and known laminating methods. The thickness of the adhesive layer is not particularly limited, however, it is preferably 0.1 μm to 5 μm. The adhesive layer may be cured with a cross-linking agent. The same cross-linking agents used for the thermoreversible recording layers can be suitably used.

—Protective Layer—

In the thermoreversible recording medium, it is desirable that a protective layer be provided on the thermoreversible recording layer, for the purpose of protecting the thermoreversible recording layer. The protective layer is suitably selected in accordance with the intended use without any restriction. For instance, the protective layer may be formed from one or more layers, and it is preferably provided on the outermost surface that is exposed.

The protective layer contains at least a binder resin and, if necessary, further contains other components such as a filler, a lubricant and a coloring pigment.

The binder resin is suitably selected in accordance with the intended use without any restriction. For instance, the resin is preferably a thermally curable resin, an ultraviolet (UV) curable resin, an electron beam curable resin, etc., with particular preference being given to an ultraviolet (UV) curable resin and a thermally curable resin.

The UV-curable resin can form a very hard film after cured, and reduce damage caused by physical contact of the surface and deformation of the medium caused by laser heating; therefore, it is possible to obtain a thermoreversible recording medium superior in durability against repeated use.

The thermally curable resin can harden the surface in the same manner as the UV-curable resin although it is slightly inferior to the UV-curable resin, and the thermally curable resin is excellent in durability against repeated use.

The UV-curable resin is suitably selected from known UV-curable resins in accordance with the intended use without any restriction. Examples thereof include oligomers based on urethane acrylates, epoxy acrylates, polyester acrylates, polyether acrylates, vinyls and unsaturated polyesters; and monomers such as monofunctional and multifunctional acrylates, methacrylates, vinyl esters, ethylene derivatives and allyl compounds. Of these, multifunctional, i.e. tetrafunctional or higher, monomers and oligomers are particularly preferable. By mixing two or more of these monomers and oligomers, it is possible to suitably adjust the hardness, degree of contraction, flexibility, coating strength, etc. of the resin film.

To cure the monomers and the oligomers with an ultraviolet ray, it is necessary to use a photopolymerization initiator or a photopolymerization accelerator.

The amount of the photopolymerization initiator or the photopolymerization accelerator added is preferably 0.1% by mass to 20% by mass, more preferably 1% by mass to 10% by mass, relative to the total mass of the resin component of the protective layer.

Ultraviolet irradiation for curing the ultraviolet curable resin can be conducted using a known ultraviolet irradiator, and examples of the ultraviolet irradiator include one equipped with a light source, a lamp fitting, a power source, a cooling device, and a conveyance device, etc.

Examples of the light source include a mercury-vapor lamp, a metal halide lamp, a potassium lamp, a mercury-xenon lamp and a flash lamp. The wavelength of the light source may be suitably selected according to the ultraviolet absorption wavelength of the photopolymerization initiator and the photopolymerization accelerator added to the thermoreversible recording medium composition.

The conditions of the ultraviolet irradiation are suitably selected in accordance with the intended use without any restriction. For instance, it is advisable to decide the lamp output, the conveyance speed, etc. according to the irradiation energy necessary to cross-link the resin.

In order to improve the conveyance ability, a releasing agent such as a silicone having a polymerizable group, a silicone-grafted polymer, wax or zinc stearate; or a lubricant such as silicone oil may be added. The amount of any of these added is preferably 0.01% by mass to 50% by mass, more preferably 0.1% by mass to 40% by mass, relative to the total mass of the resin component of the protective layer. Each of these may be used alone or in combination. Additionally, in order to prevent static electricity, a conductive filler is preferably used, more preferably a needle-like conductive filler.

The particle diameter of the inorganic pigment is not particularly limited, and for example, preferably 0.01 μm to 10.0 μm, more preferably 0.05 μm to 8.0 μm.

The amount of the inorganic pigment added is not particularly limited, however, it is preferably 0.001 parts by mass to 2 parts by mass, more preferably 0.005 parts by mass to 1 part by mass, relative to 1 part by mass of the resin.

Further, a surfactant, a leveling agent, an antistatic agent and the like, which are conventionally known may be contained in the protective layer as additives.

Also, the thermally curable resin is not particularly limited, for example, a resin similar to the binder resin used for the thermoreversible recording layer can be suitably used, for instance.

The thermally curable resin is preferably cross-linked. Therefore, as the thermally curable resin, a thermally curable resin having a group reactive with a curing agent, e.g., a hydroxyl group, amino group, and carboxyl group, is preferably used, with particular preference being given to a polymer having a hydroxyl group. To increase the strength of the protective layer, it is preferable to use a thermally curable resin having a hydroxyl value of 10 mgKOH/g or higher, because a sufficient coat film strength can be obtained. The hydroxyl value of the thermally curable resin is more preferably 30 mgKOH/g or higher, and still more preferably 40 mgKOH/g or higher. By making the protective layer have adequate coating strength, it is possible to reduce degradation of the thermoreversible recording medium even when image recording and erasing are repeatedly carried out.

The curding agent is not particularly limited, for example, a curing agent similar to the one used for the thermoreversible recording layer can be suitably used.

For a solvent, a coating solution dispersing device, a protective layer applying method, a drying method and the like used for the protective layer coating liquid, those known in the art and used for the thermoreversible recording layer can be applied. When an ultraviolet curable resin is used, a curing step by means of the ultraviolet irradiation with which coating and drying are carried out is required, in which case the ultraviolet irradiator, the light source and the irradiation conditions described above are employed.

The thickness of the protective layer is preferably 0.1 μm to 20 μm, more preferably 0.5 μm to 10 μm, still more preferably 1.5 μm to 6 μm. When the thickness is less than 0.1 μm, the protective layer cannot fully perform the function as a protective layer of the thermoreversible recording medium, the thermoreversible recording medium easily degrades through repeated use of heat, and thus it may become unable to use repeatedly. When the thickness is greater than 20 μm, it becomes impossible to pass adequate heat to a recording layer situated under the protective layer, and thus image printing and erasing by heat may not be sufficiently performed.

—Ultraviolet Absorbing Layer—

For the purpose of preventing erasure residue of the leuco dye in the thermoreversible recording layer caused by degradation of color and a light beam due to ultraviolet ray, it is desirable to provide an ultraviolet absorbing layer over the side of the thermoreversible recording layer which side is opposite to the side thereof over which the support is provided. Thus, the optical resistance of the thermoreversible recording medium can be improved. Preferably, the thickness of the ultraviolet absorbing layer is suitably selected so that the ultraviolet absorbing layer absorbs an ultraviolet ray having a wavelength of 390 nm or lower.

The ultraviolet absorbing layer includes at least a binder resin and an ultraviolet absorber and, if necessary, further includes other components such as a filler, a lubricant and a coloring pigment.

The binder resin is suitably selected in accordance with the intended use without any restriction. The binder resin used in the thermoreversible recording layer, a resin component such as a thermoplastic resin and a thermally curable resin may be used. Examples of the resin components include polyethylene, polypropylene, polystyrene, polyvinyl alcohol, polyvinyl butyral, polyurethane, saturated polyesters, unsaturated polyesters, epoxy resins, phenol resins, polycarbonates, and polyamides.

The ultraviolet absorber is not particularly limited, and both an organic compound and an inorganic compound can be used therefor.

Also, it is preferable to use a polymer having an ultraviolet absorbing structure (hereinafter otherwise referred to as "ultraviolet absorbing polymer").

Here, the term "the polymer having an ultraviolet absorbing structure" means a polymer having an ultraviolet absorbing structure (e.g. ultraviolet absorbing group) in its molecule. Examples of the ultraviolet absorbing structure include a salicylate structure, cyanoacrylate structure, benzotriazole structure and benzophenone structure. Of these, benzotriazole structure and benzophenone structure are particularly preferable for their capability of absorbing an ultraviolet ray having a wavelength of 340 nm to 400 nm, which causes optical degradation of leuco dyes.

The ultraviolet absorbing polymer is preferably cross-linked. Therefore, as the ultraviolet absorbing polymer, an ultraviolet absorbing polymer having a group reactive with a curing agent, e.g., a hydroxyl group, amino group, and carboxyl group, is preferably used, with particular preference being given to a polymer having a hydroxyl group. To increase the strength of the ultraviolet absorbing layer, it is preferable to use a polymer having a hydroxyl value of 10 mgKOH/g or higher, because a sufficient coat film strength can be obtained. The hydroxyl value of the polymer is more preferably 30 mgKOH/g or higher, and still more preferably 40 mgKOH/g or higher. By making the ultraviolet absorbing layer have adequate coating strength, it is possible to reduce degradation of the thermoreversible recording medium even when image recording and erasing are repeatedly carried out.

The thickness of the ultraviolet absorbing layer is preferably 0.1 μm to 30 μm, more preferably 0.5 μm to 20 μm. For a solvent, a coating solution dispersing device, an ultraviolet absorbing layer applying method, a drying and curing method and the like used for the ultraviolet absorbing layer coating liquid, those known in the art and used for the thermoreversible recording layer can be applied.

—Intermediate Layer—

It is desirable to provide an intermediate layer between the thermoreversible recording layer and the protective layer, for the purpose of improving adhesiveness between the thermoreversible recording layer and the protective layer, preventing change in the quality of the thermoreversible recording layer caused by application of the protective layer, and preventing the additives in the protective layer from transferring to the thermoreversible recording layer. This makes it possible to improve the ability to store a colored image.

The intermediate layer contains at least a binder resin and, if necessary, further contains other components such as a filler, a lubricant and a coloring pigment.

The binder resin may be suitably selected in accordance with the intended use without any restriction, and the binder resin used for the thermoreversible recording layer, and a resin component such as a thermoplastic resin and a thermally curable resin may be used. Examples of the resin component include polyethylene, polypropylene, polystyrene, polyvinyl alcohol, polyvinyl butyral, polyurethane, saturated polyesters, unsaturated polyesters, epoxy resins, phenol resins, polycarbonates and polyamides.

It is desirable that the intermediate layer contain an ultraviolet absorber. For the ultraviolet absorber, both an organic compound and an inorganic compound may be used.

Also, an ultraviolet absorbing polymer may be used, and this may be cured with a cross-linking agent. As these compounds, compounds similar to those used for the protective layer can be suitably used.

The thickness of the intermediate layer is not particularly limited, however, it is preferably 0.1 μm to 20 μm, more preferably 0.5 μm to 5 μm. For a solvent, a coating solution dispersing device, an intermediate layer applying method, drying and curing method and the like used for the intermediate layer coating liquid, those known in the art and used for the thermoreversible recording layer can be applied.

—Under Layer—

An under layer may be provided between the thermoreversible recording layer and the support, for the purpose of effectively utilizing applied heat for high sensitivity, or improving adhesiveness between the support and the thermoreversible recording layer, and preventing permeation of thermoreversible recording layer materials into the support.

The under layer contains at least hollow particles, also contains a binder resin and, if necessary, further contains other components.

Examples of the hollow particles include single hollow particles in which only one hollow portion is present in each particle, and multi hollow particles in which numerous hollow portions are present in each particle. These types of hollow particles may be used independently or in combination.

The material for the hollow particles is suitably selected in accordance with the intended use without any restriction, and suitable examples thereof include thermoplastic resins. For the hollow particles, suitably produced hollow particles may be used, or a commercially available product may be used. Examples of the commercially available product include MICROSPHERE R-300 (produced by Matsumoto Yushi-Seiyaku Co., Ltd.); ROPAQUE HP1055 and ROPAQUE HP433J (both of which are produced by Zeon Corporation); and SX866 (produced by JSR Corporation).

The amount of the hollow particles added to the under layer is suitably selected in accordance with the intended use without any restriction, and it is preferably 10% by mass to 80% by mass, for instance.

The binder resin is not particularly limited, and a resin similar to the resin used for the thermoreversible recording layer or used for the ultraviolet absorbing layer or used for the protective layer can be used.

The under layer may contain at least one of an organic filler and an inorganic filler such as calcium carbonate, magnesium carbonate, titanium oxide, silicon oxide, aluminum hydroxide, kaolin or talc.

Besides, the under layer may contain a lubricant, a surfactant, a dispersant and the like.

The thickness of the under layer is suitably selected in accordance with the intended use without any restriction. It is preferably 0.1 µm to 50 µm, more preferably 2 µm to 30 µm, and still more preferably 12 µm to 24 µm.

—Back Layer—

For the purpose of preventing curl and static charge on the thermoreversible recording medium and improving the conveyance ability, a back layer may be provided on a surface of the support, which surface is opposite to the surface where the thermoreversible recording layer is formed.

The back layer contains at least a binder resin and, if necessary, further contains other components such as a filler, a conductive filler, a lubricant and a coloring pigment.

The binder resin may be suitably selected in accordance with the intended use without any restriction. For example, the binder resin is any one of a thermally curable resin, an ultraviolet (UV) curable resin, an electron beam curable resin, etc., with particular preference being given to an ultraviolet (UV) curable resin and a thermally curable resin.

For the ultraviolet curable resin, the thermally curable resin, the filler, the conductive filler and the lubricant, ones similar to those used for the thermoreversible recording layer, or the protective layer can be suitably used.

—Adhesive Layer or Tackiness Layer—

The thermoreversible recording medium can be produced as a thermoreversible recording label by providing an adhesive layer or a tackiness layer on a surface of the support, which surface is opposite to the surface where the thermoreversible recording layer is formed. The material for the adhesive layer or the tackiness layer can be selected from commonly used materials.

The material for the adhesive layer or the tackiness layer may be suitably selected in accordance with the intended purpose without any restriction. Examples thereof include urea resins, melamine resins, phenol resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester resins, polyurethane resins, polyamide resins, chlorinated polyolefin resins, polyvinyl butyral resins, acrylic acid ester copolymers, methacrylic acid ester copolymers, natural rubbers, cyanoacrylate resins and silicone resins.

The material for the adhesive layer or the tackiness layer is not particularly limited and may be of a hot-melt type. Release paper may or may not be used. By providing the adhesive layer or the tackiness layer, the thermoreversible recording label can be affixed to a whole surface or a part of a thick substrate such as a magnetic stripe-attached vinyl chloride card, which is difficult to coat with a thermoreversible recording layer. This makes it possible to improve the convenience of this medium, for example to display part of information stored in a magnetic recorder. The thermoreversible recording label provided with such an adhesive layer or tackiness layer can also be applied to thick cards such as IC cards and optical cards.

In the thermoreversible recording medium, a coloring layer may be provided between the support and the thermoreversible recording layer, for the purpose of improving visibility. The coloring layer can be formed by applying a dispersion solution or a solution containing a colorant and a binder resin over a target surface and drying the dispersion solution or the solution; alternatively, the coloring layer can be formed by simply bonding a coloring sheet to the target surface.

The thermoreversible recording medium may be provided with a color printing layer. A colorant in the color printing layer is, for example, selected from dyes, pigments and the like contained in color inks used for conventional full-color printing. Examples of the binder resin include thermoplastic resins, thermally curable resins, ultraviolet curable resins and electron beam curable resins. The thickness of the color printing layer may be suitably selected according to the desired printed color density, because the thickness is appropriately changed depending on a printing color density.

In the thermoreversible recording medium, an irreversible thermoreversible recording layer may be additionally used. In this case, the colored color tones of the thermoreversible recording layers may be identical or different. Also, a coloring layer which has been printed in accordance with offset printing, gravure printing, etc. or which has been printed with any pictorial design or the like using an ink-jet printer, a thermal transfer printer, a sublimation printer, etc., for example, may be provided on the whole or a part of the same surface of the thermoreversible recording medium of the present invention as the surface where the thermoreversible recording layer is formed, or may be provided on a part of the opposite surface thereof. Further, an OP varnish layer composed mainly of a curable resin may be provided on a part or the whole surface of the coloring layer. Examples of the pictorial design include letters/characters, patterns, diagrams, photographs, and information detected with an infrared ray. Also, any of the layers may be colored simply by addition of dye or pigment.

Further, the thermoreversible recording medium may be provided with a hologram for security. Also, to give variety in design, the thermoreversible recording medium may also be provided with a design such as a portrait, a company emblem or a symbol by forming depressions and protrusions in relief or in intaglio.

The thermoreversible recording medium may be formed into a desired shape according to its use, for example, into a card, a tag, a label, a sheet or a roll. The thermoreversible recording medium in the form of a card can be used for prepaid cards, discount cards, i.e. so-called point cards, credit cards and the like. The thermoreversible recording medium in the form of a tag that is smaller in size than the card can be used for price tags and the like. The thermoreversible recording medium in the form of a tag that is larger in size than the card can be used for tickets, sheets of instruction for process control and shipping, and the like. The thermoreversible recording medium in the form of a label can be affixed; accordingly, it can be formed into a variety of sizes and, for example, used for process control and product control, being affixed to carts, receptacles, boxes, containers, etc. to be repeatedly used. The thermoreversible recording medium in the form of a sheet that is larger in size than the card offers a larger area for image recording, and thus it can be used for general documents and sheets of instruction for process control, for example.

<Image Recording and Image Erasing Mechanism>

The image recording and image erasing mechanism includes an embodiment in which color tone reversibly changes by heat. The embodiment is such that a combination of a leuco dye and a reversible developer (hereinafter otherwise referred to as "developer") enables the color tone to reversibly change by heat between a transparent state and a colored state.

Figure 5A:
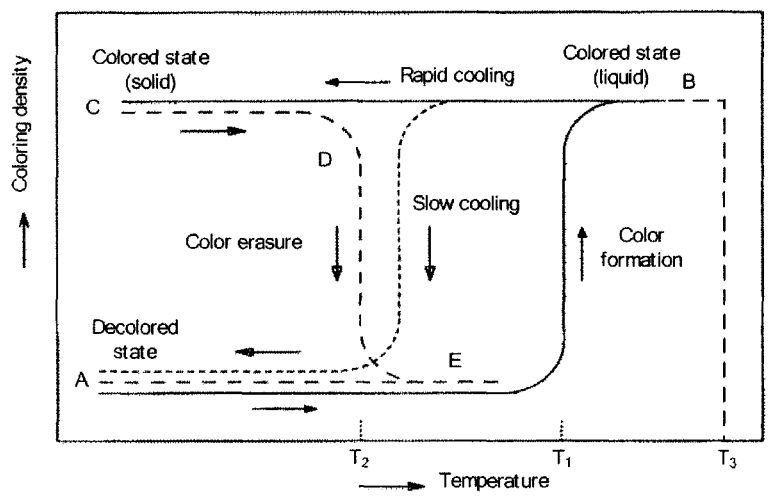
FIG. 5A is a graph showing color developing/decoloring properties of a thermoreversible recording medium.
Figure 5B:
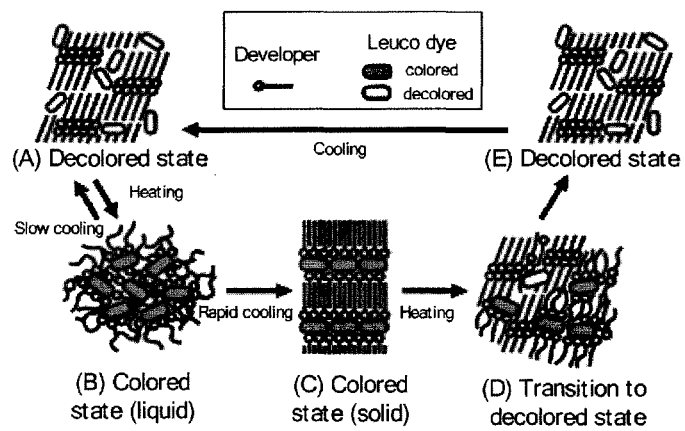
FIG. 5B is a schematic diagram showing a coloring and decoloring mechanism of a thermoreversible recording medium.

FIG. 5A shows an example of the temperature—coloring density change curve of a thermoreversible recording medium which has a thermoreversible recording layer formed of the resin containing the leuco dye and the developer. FIG. 5B shows the coloring and decoloring mechanism of the thermoreversible recording medium which reversibly changes by heat between a transparent state and a colored state.

First of all, when the recording layer in a decolored (colorless) state (A) is raised in temperature, the leuco dye and the developer melt and mix at the melting temperature $T_1$, thereby developing color, and the recording layer thusly comes into a melted and colored state (B). When the recording layer in the melted and colored state (B) is rapidly cooled, the recording layer can be lowered in temperature to room temperature, with its colored state kept, and it thusly comes into a colored state (C) where its colored state is stabilized and fixed. Whether or not this colored state is obtained depends on the temperature decreasing rate from the temperature in the melted state: in the case of slow cooling, the color is erased in the temperature decreasing process, and the recording layer returns to the decolored state (A) it was in at the beginning, or comes into a state where the density is low in comparison with the density in the colored state (C) produced by rapid cooling. When the recording layer in the colored state (C) is raised in temperature again, the color is erased at the temperature $T_2$ lower than the coloring temperature (from D to E), and when the recording layer in this state is lowered in temperature, it returns to the decolored state (A) it was in at the beginning.

The colored state (C) obtained by rapidly cooling the recording layer in the melted state is a state where the leuco dye and the developer are mixed together such that their molecules can undergo contact reaction, which is often a solid state. This state is a state where a melted mixture (coloring mixture) of the leuco dye and the developer crystallizes, and thus color is maintained, and it is inferred that the color is stabilized by the formation of this structure. Meanwhile, the decolored state (A) is a state where the leuco dye and the developer are phase-separated. It is inferred that this state is a state where molecules of at least one of the compounds gather to constitute a domain or crystallize, and thus a stabilized state where the leuco dye and the developer are separated from each other by the occurrence of the flocculation or the crystallization. In many cases, phase separation of the leuco dye and the developer is brought about, and the developer crystallizes in this manner, thereby enabling color erasure with greater completeness.

As to both the color erasure by slow cooling from the melted state and the color erasure by temperature increase from the colored state shown in FIG. 5A, the aggregation structure changes at $T_2$, causing phase separation and crystallization of the developer.

Further, in FIG. 5A, when the temperature of the recording layer is repeatedly raised to the temperature $T_3$ higher than or equal to the melting temperature $T_1$, there may be caused such an erasure failure that an image cannot be erased even if the recording layer is heated to an erasing temperature. It is inferred that this is because the developer thermally decomposes and thus hardly flocculates or crystallizes, which makes it difficult for the developer to separate from the leuco dye. Deterioration of the thermoreversible recording medium caused by repeated image processing can be reduced by decreasing the difference between the melting temperature $T_1$ and the temperature $T_3$ in FIG. 5A when the thermoreversible recording medium is heated.

<Example of Combination of Thermoreversible Recording Member and RF-ID>

A thermoreversible recording member used in the present invention is superior in convenience because the thermoreversible recording layer capable of reversible display, and an information storage section are provided on the same card or tag (so as to form a single unit), and part of information stored in the information storage section is displayed on the thermoreversible recording layer, thereby making it possible to confirm the information by simply looking at a card or a tag without needing a special device. Also, when information stored in the information storage section is rewritten, rewriting of information displayed by the thermoreversible recording member makes it possible to use the thermoreversible recording medium repeatedly as many times as desired.

The information storage section is suitably selected in accordance with the intended use without any restriction, and suitable examples thereof include a magnetic thermoreversible recording layer, a magnetic stripe, an IC memory, an optical memory and an RF-ID tag. In the case where the information storage section is used for process control, product control, etc., an RF-ID tag is particularly preferably used. The RF-ID tag is composed of an IC chip, and an antenna connected to the IC chip.

The thermoreversible recording member includes the thermoreversible recording layer capable of reversible display, and the information storage section. Suitable examples of the information storage section include an RF-ID tag.

Figure 4:
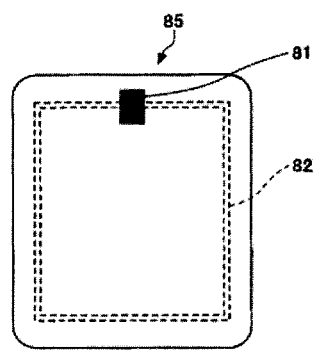
FIG. 4 is a schematic diagram showing an example of an RF-ID tag.

Here, FIG. 4 shows a schematic diagram of an example of an RF-ID tag 85. This RF-ID tag 85 is composed of an IC chip 81, and an antenna 82 connected to the IC chip 81. The IC chip 81 is divided into four sections, i.e. a storage section, a power adjusting section, a transmitting section and a receiving section, and communication is conducted as they perform their operations allotted. As for the communication, the RF-ID tag communicates with an antenna of a reader/writer by means of a radio wave so as to transfer data. Specifically, there are such two methods as follows: an electromagnetic induction method in which the antenna of the RF-ID tag receives a radio wave from the reader/writer, and electromotive force is generated by electromagnetic induction caused by resonance; and a radio wave method in which electromotive force is generated by a radiated electromagnetic field. In both methods, the IC chip inside the RF-ID tag is activated by an electromagnetic field from outside, information inside the chip is converted to a signal, then the signal is emitted from the RF-ID tag. This information is received by the antenna on the reader/writer side and recognized by a data processing unit, and then data processing is carried out on the software side.

The RF-ID tag is formed into a label shape or a card shape and can be affixed to the thermoreversible recording medium. The RF-ID tag may be affixed to the thermoreversible recording layer surface or the back layer surface, preferably to the back layer surface. To stick the RF-ID tag and the thermoreversible recording medium together, a known adhesive or tackiness agent may be used.

Additionally, the thermoreversible recording medium and the RF-ID tag may be integrally formed by lamination or the like and then formed into a card shape or a tag shape.

EXAMPLES

Hereinafter, the present invention will be described in more detail with reference to Examples, which however shall not be construed as limiting the scope of the present invention.

In Examples and Comparative Examples below, as a preferable example of a recording medium, a thermoreversible recording medium was produced, and evaluated. The case where image recording was performed only once using the thermoreversible recording medium, without repeating image recording and image erasing, corresponds to Example in which a thermal recording medium was evaluated.

Production Example 1

<Production of Thermoreversible Recording Medium>

A thermoreversible recording medium capable of reversibly changing in color tone by heat was produced in the following manner.

—Support—

As a support, a white turbid polyester film of 125 μm in thickness (TETRON FILM U2L98W, produced by Teijin DuPont Films Japan Limited) was used.

—Formation of First Oxygen Barrier Layer—

A urethane-based adhesive (produced by Toyo-Morton Ltd., TM-567) (5 parts by mass), 0.5 parts by mass of isocyanate (produced by Toyo-Morton Ltd., CAT-RT-37), and 5 parts by mass of ethyl acetate were mixed and sufficiently stirred to prepare an oxygen barrier layer coating liquid.

Next, the oxygen barrier layer coating liquid was applied onto a silica-deposited PET film (produced by Mitsubishi Plastics Inc., TECHBARRIER HX, oxygen permeability: 0.5 mL/m²/day/MPa) using a wire bar, heated and dried at 80° C. for 1 minute. This silica-deposited PET film provided with the oxygen barrier layer was bonded on the support, and then heated at 50° C. for 24 hours, thereby forming a first oxygen barrier layer having a thickness of 12 μm.

—Formation of First Thermoreversible Recording Layer—

A reversible developer represented by the following Structural Formula 1 (5 parts by mass), 0.5 parts by mass of a color-erasing accelerator represented by the following Structural Formula 2, 0.5 parts by mass of a color-erasing accelerator represented by the following Structural Formula 3, 10 parts by mass of a 50% by mass acrylpolyol solution (hydroxyl group value: 200 mgKOH/g) and 80 parts by mass of methylethylketone were pulverized and dispersed in a ball mill until the average particle diameter became about 1 μm.

Structural Formula 1

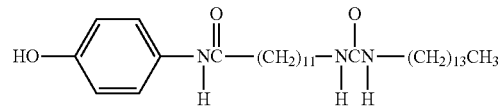

Structural Formula 2

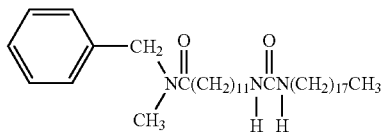

Structural Formula 3

Next, in a dispersion liquid in which the reversible developer had been pulverized and dispersed, 1 part by mass of 2-anilino-3-methyl-6-dibutylaminofluoran as the leuco dye, and 5 parts by mass of isocyanate (COLLONATE HL, produced by Nippon Polyurethane Industry Co., Ltd.) were added, and then sufficiently stirred to prepare a thermoreversible recording layer coating liquid.

The thus obtained thermoreversible recording layer coating liquid was applied onto the first oxygen barrier layer using a wire bar, dried at 100° C. for 2 minutes, and then cured at 60° C. for 24 hours, thereby forming a first thermoreversible recording layer having a thickness of 6 μm.

—Formation of Photothermal Conversion Layer—

A 1% by mass solution of a phthalocyanine photothermal conversion material (produced by NIPPON SHOKUBAI CO., LTD.; IR-14, absorption peak wavelength: 824 nm) (4 parts by mass), 10 parts by mass of a 50% by mass acrylpolyol solution (hydroxyl group value: 200 mgKOH/g), 20 parts by mass of methylethylketone and 5 parts by mass of isocyanate (COLLONATE HL, produced by Nippon Polyurethane Industry Co., Ltd.) as a cross-linking agent were sufficiently stirred to prepare a photothermal conversion layer coating liquid. The thus obtained photothermal conversion layer coating liquid was applied onto the first thermoreversible recording layer using a wire bar, dried at 90° C. for 1 minute and then cured at 60° C. for 24 hours, thereby forming a photothermal conversion layer having a thickness of 3 μm.

—Formation of Second Thermoreversible Recording Layer—

A thermoreversible recording layer coating liquid, which was the same as the coating liquid used in the first thermoreversible recording layer was applied onto the photothermal conversion layer using a wire bar, dried at 100° C. for 2 minutes and then cured at 60° C. for 24 hours, thereby forming a second thermoreversible recording layer having a thickness of 6 μm.

—Formation of Ultraviolet Absorbing Layer—

A 40% by mass solution of ultraviolet absorbing polymer (UV-G300, produced by NIPPON SHOKUBAI CO., LTD.) (10 parts by mass), 1.5 parts by mass of isocyanate (COLLONATE HL, produced by Nippon Polyurethane Industry Co., Ltd.) and 12 parts by mass of methylethylketone were mixed and sufficiently stirred to prepare an ultraviolet absorbing layer coating liquid.

Next, the ultraviolet absorbing layer coating liquid was applied onto the second thermoreversible recording layer using a wire bar, heated and dried at 90° C. for 1 minute and then heated at 60° C. for 24 hours, thereby forming an ultraviolet absorbing layer having a thickness of 2 µm.

—Formation of Second Oxygen Barrier Layer—

A silica-deposited PET film provided with an oxygen barrier layer, similar to the first oxygen barrier layer, was bonded on the ultraviolet absorbing layer, and then heated at 50° C. for 24 hours, thereby forming a second oxygen barrier layer having a thickness of 12 µm.

—Formation of Back Layer—

In a ball mill, 7.5 parts by mass of pentaerythritol hexaacrylate (KARAYAD DPHA, produced by Nippon Kayaku Co., Ltd.), 2.5 parts by mass of urethane acrylate oligomer (ART RESIN UN-3320HA, produced by Negami Chemical Industrial Co., Ltd.), 2.5 parts by mass of a needle-like conductive titanium oxide (FT-3000, produced by ISHIHARA INDUSTRY CO., LTD., major axis=5.15 µm, minor axis=0.27 µm, composition: titanium oxide coated with antimony-doped tin oxide), 0.5 parts by mass of a photopolymerization initiator (IRGACURE 184, produced by Chiba Geigy Japan Co., Ltd.) and 13 parts by mass of isopropyl alcohol were sufficiently stirred to prepare a back layer coating liquid.

Next, over the opposite surface of the support from the surface on which the first thermoreversible recording layer and the like had been formed, the back layer coating liquid was applied using a wire bar, and the applied coating liquid was heated at 90° C. for 1 minute, dried and then cross-linked by means of an ultraviolet lamp of 80 W/cm to thereby form a back layer having a thickness of 4 µm. With the above-mentioned treatments, a thermoreversible recording medium of Production Example 1 was produced.

Production Example 2

—Production of Thermoreversible Recording Medium—

A thermoreversible recording medium of Production Example 2 was produced in the same manner as in Production Example 1, except that as the photothermal conversion material instead of the phthalocyanine photothermal conversion material, 2 parts by mass of a solution of 0.5% by mass of cyanine photothermal conversion material (YKR-2900, produced by Yamamoto Chemicals, Inc.; absorption peak wavelength: 830 nm) was added, and sufficiently stirred to prepare a photothermal conversion layer coating liquid. The cyanine photothermal conversion material (YKR-2900, produced by Yamamoto Chemicals, Inc.) was added in the amount that gave the same sensitivity of the thermoreversible recording medium as that of Production Example 1.

Production Example 3

—Production of Thermoreversible Recording Medium—

A thermoreversible recording medium of Production Example 3 was produced in the same manner as in Production Example 1, except that in the first thermoreversible recording layer as the photothermal conversion material an inorganic photothermal conversion material (lanthanum boride liquid, produced by Sumitomo Metal Mining Co., Ltd.) was added while the amount of the inorganic photothermal conversion material was adjusted so that the thermoreversible recording medium of Production Example 3 had the same sensitivity as the thermoreversible recording medium of Production Example 1, followed by forming the first thermoreversible recording layer having a thickness of 12 µm, and that the first oxygen barrier layer, the second oxygen barrier layer, the photothermal conversion layer, and the second thermoreversible recording layer were not formed.

Production Example 4

—Production of Thermoreversible Recording Medium—

A thermoreversible recording medium of Production Example 4 was produced in the same manner as in Production Example 1, except that in the first thermoreversible recording layer as the photothermal conversion material an inorganic photothermal conversion material (lanthanum boride liquid, produced by Sumitomo Metal Mining Co., Ltd.) was added while the amount of the inorganic photothermal conversion material was adjusted so that the thermoreversible recording medium of Production Example 4 had the same sensitivity as the thermoreversible recording medium of Production Example 1, followed by forming the first thermoreversible recording layer having a thickness of 12 µm, and that the photothermal conversion layer, and the second thermoreversible recording layer were not formed.

Production Example 5

—Production of Thermal Recording Paper—

(1) Preparation of Dye Dispersion Liquid (Liquid A)

The following compositions were dispersed using a sand mill until the liquid had an average particle diameter of 0.5 µm, so as to prepare Liquid A.

| | |
|---|---|
| 2-anilino-3-methyl-6-dibutylaminofluoran | 20 parts by mass |
| 10% by mass aqueous solution of polyvinyl alcohol | 20 parts by mass |
| Water | 60 parts by mass |

(2) Preparation of Liquid B

The following compositions were dispersed using a ball mill until the liquid had an average particle diameter of 1.5 µm, so as to prepare Liquid B.

| | |
|---|---|
| Aluminum hydroxide | 20 parts by mass |
| 4-hydroxy-4'-isopropoxydiphenylsulfone | 20 parts by mass |
| 10% by mass aqueous solution of polyvinyl alcohol | 20 parts by mass |
| Water | 40 parts by mass |

(3) Preparation of Liquid C

The following compositions were dispersed using a ball mill until the liquid had an average particle diameter of 1.5 µm, so as to prepare Liquid C.

| | |
|---|---|
| Aluminum hydroxide | 100 parts by mass |
| 10% by mass aqueous solution of polyvinyl alcohol | 20 parts by mass |
| Water | 40 parts by mass |

(4) Preparation of Thermal Recording Layer Coating Liquid

The following compositions were mixed and prepared, and then to the mixture an inorganic photothermal conversion material (lanthanum boride liquid, produced by Sumitomo Metal Mining Co., Ltd.) was added, to thereby prepare a thermal recording layer coating liquid.

| | |
|---|---|
| Liquid A | 20 parts by mass |
| Liquid B | 60 parts by mass |
| Resin aqueous solution (diacetone-modified polyvinyl alcohol, solid content: 10% by mass) | 30 parts by mass |
| Aqueous solution of dioctyl sulfosuccinic acid (solid content: 5% by mass) | 1 part by mass |

(5) Preparation of Protective Layer Coating Liquid

The following compositions were mixed so as to prepare a protective layer coating liquid.

| | |
|---|---|
| Liquid C | 60 parts by mass |
| Aqueous solution of diacetone-modified polyvinyl alcohol (solid content: 10% by mass) | 100 parts by mass |
| Aqueous acrylic resin solution (acid value: 600 mgKOH/g, sodium polyacrylate, Jurimer AC103, produced by Nihon junyaku Co., Ltd., solid content: 10% by mass) | 20 parts by mass |
| Aqueous solution of adipic acid dihydrazide (solid content: 10% by mass) | 10 parts by mass |
| Aqueous solution of dioctyl sulfosuccinic acid (solid content: 5% by mass) | 1 part by mass |

(6) Production of Thermal Recording Paper

Onto a support (woodfree paper having a basis weight of 60 g/m$^2$), a thermal recording coating liquid as described above was applied so that the dye was adhered in an amount of 0.50 g/m$^2$, and dried to thereby form a thermal recording layer.

Next, onto the thermal recording layer, a protective layer coating liquid as described below was applied so that the coating liquid was adhered in an amount of 3.0 g/m$^2$ in a dried state, and dried to thereby form a protective layer. Thus, thermal recording paper of Production Example 5 was produced.

Example 1

Image recording was performed on the thermoreversible recording medium of Production Example 1 with a LD marker. Specifically, a laser beam was emitted from a fiber coupled LD (a semiconductor laser) ES-6200-A (center wavelength: 808 nm) produced by QPC Laser Inc. The emitted laser beam was passed through two collimator lenses (focal distance: 26 mm) to collimate the laser beam, and the collimated laser beam was swept by a galvano scanner 6230H (produced by Cambridge), and condensed with an fθ lens (focal distance: 141 mm) on the thermoreversible recording medium.

Figure 6A:
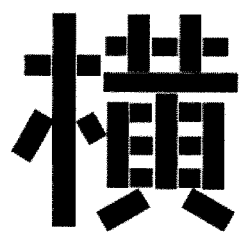
FIG. 6A is an example of a diagram for explaining printing a character "横" used in Examples, in which an overlapped portion is subjected to non-overlapping treatment.
Figure 6B:
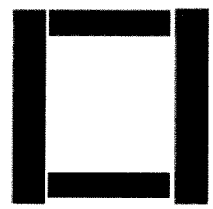
FIG. 6B is an example of a diagram for explaining printing a character "口" used in Examples, in which an overlapped portion is subjected to non-overlapping treatment.
Figure 6C:
FIG. 6C is an example of a diagram for explaining printing a character "一" used in Examples.

The entire length L of the drawing line of a character was calculated based on the coordinate information of three characters "横", "口" and "一" shown in FIGS. 6A to 6C, each having a size of 4 mm×4 mm and a line width of 0.4 mm, and an area S of each character was calculated by the formula: L*0.4 mm, to obtain a density of each of the characters "横", "口" and "一". The densities of the characters "横", "口" and "一" were respectively 0.47, 0.19, and 0.08. Note that the overlapped portion of the character was subjected to non-overlapping treatment. Specifically, the non-overlapping treatment was performed in such a manner that, usually, the character information shown in FIGS. 6D and 6E was loaded in a laser maker, in order not to record the overlapped portion based on the information of a line width, as shown in FIGS. 6A and 6B, recording of the segment of the overlapped portion was omitted so as to perform non-overlapping treatment. The entire length L of the drawing line of the character was obtained by sum of the lengths between coordinates based on the information of the coordinate conversion of the character computed with the laser marker.

Next, in the LD marker, an operation distance and the scanning speed of the laser beam were adjusted respectively to 141 mm (beam diameter of 0.65 mm) and 2,500 mm/s. Using the LD marker, three characters "横", "口" and "一" shown in FIGS. 6A to 6C, each having a size of 4 mm×4 mm and a line width of 0.4 mm were printed with adjusting irradiation power of the laser beam respectively to 20.0 W, 21.3 W, and 22.0 W.

Here, an operation distance means a distance between the recording medium and an optical head surface of the LD marker in which fθ was arranged.

Example 2

Image recording of Example 2 was performed in the same manner as in Example 1, except that using the LD marker, in which the operation distance and the irradiation power of the laser beam were adjusted respectively to 141 mm and 22.0 W, the three characters "横", "口" and "一" shown in FIGS. 6A to 6C, each having a size of 4 mm×4 mm and a line width of 0.4 mm were printed with adjusting the scanning speed of the laser beam respectively to 2,750 mm/s, 2,600 mm/s, and 2,500 mm/s. The overlapped portions of the characters were subjected to the non-overlapping treatment.

Example 3

Image recording of Example 3 was performed in the same manner as in Example 1, except that using the LD marker, in which the operation distance and the irradiation power of the laser beam were adjusted respectively to 141 mm and 21.0 W, the character "横" shown in FIG. 6A having a size of 4 mm×4 mm and a line width of 0.4 mm was printed with adjusting the scanning speed of the laser beam to 2,600 mm/s. The overlapped portions of the character were subjected to the non-overlapping treatment.

Example 4

The entire length L of the drawing line of a character was calculated based on the coordinate information of the characters "横" shown in FIG. 6A each having a line width of 0.4 mm and a size of 4 mm×4 mm, and a line width of 0.4 mm and a size of 8 mm×8 mm, and an area S of each character was calculated respectively by the formula: L*0.4 mm, to obtain a density of each character "横". The character "横" in the case of the size of 4 mm×4 mm had a density of 0.47, and the character "横" in the case of the size of 8 mm×8 mm had a density of 0.25.

Image recording of Example 4 was performed in the same manner as in Example 1, except that using the LD marker, in which the operation distance and the scanning speed of the laser beam were adjusted respectively to 141 mm and 2,500 mm/s, the characters "横" shown in FIG. 6A each having a line width of 0.4 mm and a size of 4 mm×4 mm, and a line width of 0.4 mm and a size of 8 mm×8 mm were printed with adjusting the irradiation power of the laser beam respectively to 20.0 W and 21.0 W. The overlapped portions of the characters were subjected to the non-overlapping treatment.

Example 5

The entire length L of the drawing line of a character was calculated, based on the coordinate information of the characters "横" shown in FIG. 6A each having a size of 8 mm×8 mm and a line width of 0.4 mm and a size of 8 mm×8 mm and a line width of 0.8 mm (printed with two lines), and an area S of each character was calculated respectively by the formula: L*0.4 mm and L*0.8 mm, to obtain a density of each character "横". The character "横" in the case of the line width of 0.4 mm had a density of 0.25, and the character "横" in the case of the line width of 0.8 mm had a density of 0.47.

Image recording of Example 5 was performed in the same manner as in Example 1, except that using the LD marker, in which the operation distance and the scanning speed of the laser beam were adjusted respectively to 141 mm and 2,500 mm/s, the characters "横" shown in FIG. 6A each having a size of 8 mm×8 mm and a line width of 0.4 mm, and a size of 8 mm×8 mm and a line width of 0.8 mm (printed with two lines) were printed with adjusting the irradiation power of the laser beam respectively to 21.0 W and 20.0 W. The overlapped portions of the characters were subjected to the non-overlapping treatment.

Example 6

Figure 6D:
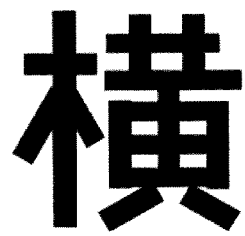
FIG. 6D is an example of a diagram for explaining printing a character "横" used in Examples, in which an overlapped portion is not subjected to non-overlapping treatment.
Figure 6E:
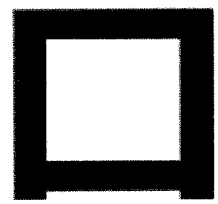
FIG. 6E is an example of a diagram for explaining printing a character "口" used in Examples, in which an overlapped portion is not subjected to non-overlapping treatment.

The character "横" shown in FIG. 6D was printed under the same conditions of Example 1, except that the overlapped portions of the character were not subjected to the non-overlapping treatment.

Example 7

The three characters "横", "｜" and "一" shown in FIGS. 6A to 6C, each having a size of 4 mm×4 mm and a line width of 0.4 mm were printed with adjusting the irradiation power of the laser beam respectively to 20.0 W, 21.3 W, and 22.0 W, in the same manner as in Example 1, except that the thermoreversible recording medium of Production Example 1 was replaced with the thermoreversible recording medium of Production Example 2. The overlapped portions of the characters were subjected to the non-overlapping treatment.

Example 8

The three characters "横", "口" and "一" shown in FIGS. 6A to 6C, each having a size of 4 mm×4 mm and a line width of 0.4 mm were printed with adjusting the irradiation power of the laser beam respectively to 20.0 W, 21.3 W, and 22.0 W, in the same manner as in Example 1, except that the thermoreversible recording medium of Production Example 1 was replaced with the thermoreversible recording medium of Production Example 3. The overlapped portions of the characters were subjected to the non-overlapping treatment.

Example 9

The three characters "横", "口" and "一" shown in FIGS. 6A to 6C, each having a size of 4 mm×4 mm and a line width of 0.4 mm were printed with adjusting the irradiation power of the laser beam respectively to 20.0 W, 21.3 W, and 22.0 W, in the same manner as in Example 1, except that the thermoreversible recording medium of Production Example 1 was replaced with the thermoreversible recording medium of Production Example 4. The overlapped portions of the characters were subjected to the non-overlapping treatment.

Example 10

Image recording was performed on the thermoreversible recording medium of Production Example 4 with a LD marker. Specifically, a laser beam was emitted from a fiber coupled LD (a semiconductor laser) BMU25-975-01-R (center wavelength: 976 nm) produced by Oclaro, Inc. The emitted laser beam was passed through two collimator lenses (focal distance: 37 mm) to collimate the laser beam, and the collimated laser beam was swept by a galvano scanner 6230H (produced by Cambridge), and condensed with an fθ lens (focal distance: 189 mm) on the thermoreversible recording medium.

The entire length L of the drawing line of a character was calculated based on the coordinate information of three characters "横", "口" and "一" shown in FIGS. 6A to 6C, each having a size of 2.5 mm×2.5 mm and a line width of 0.25 mm, and an area S of each character was calculated by the formula: L*0.25 mm, to obtain a density of each of the characters "横", "口" and "一". The densities of the characters "横", "口" and "一" were respectively 0.47, 0.19, and 0.08. Note that the overlapped portion of the character was subjected to non-overlapping treatment. Specifically, the non-overlapping treatment was performed in such a manner that, usually, the character information shown in FIGS. 6D and 6E was loaded in a laser maker, and based on the information of a line width, in order not to redundantly record the overlapped portion, as shown in FIGS. 6A and 6B, the segment of the overlapped portion was cut so as to shorten the approximate line width. The entire length L of the drawing line of the character was obtained by sum of the lengths between coordinates based on the information of the coordinate conversion of the character computed with the laser marker.

Next, in the LD marker, the operation distance and the scanning speed of the laser beam were adjusted respectively to 175 mm (beam diameter of 0.50 mm) and 3,000 mm/s. Using the LD marker, three characters "横", "口" and "一" shown in FIGS. 6A to 6C, each having a size of 2.5 mm×2.5 mm and a line width of 0.25 mm were printed with adjusting irradiation power of the laser beam respectively to 15.0 W, 16.0 W, and 16.5 W.

Example 11

The character "轟" shown in FIG. 7A was changed to the character shown in FIG. 7C which was a font for a small size character, and the character having a size of 3 mm×3 mm and a line width of 0.25 mm was printed on the thermoreversible recording medium of Production Example 4 using the LD marker used in Example 10, in which the scanning speed of the laser beam and the irradiation power of the laser beam were adjusted respectively to 3,000 mm/s and 14.0 W.

The entire length L of the drawing line of the character was calculated based on the coordinate information of the character shown in FIG. 7C having a size of 3 mm×3 mm and a line width of 0.25 mm, and an area S of the character was calculated by the formula: L*0.25 mm to obtain a density of the character "轟". The character "轟" had a density of 0.54. The overlapped portion of the character was subjected to the non-overlapping treatment.

Example 12

Using a LP-Z FAYb fiber laser (center wavelength: 1,060 nm) produced by Panasonic Electric Works SUNX Co., Ltd., in which the operation distance was adjusted so that a beam diameter became 0.30 mm and the scanning speed of the laser beam was adjusted to 1,000 mm/s, the characters "横", "口" and "一" shown in FIGS. 6A to 6C, each having a size of 2 mm×2 mm and a line width of 0.20 mm were printed on a plate formed of polypropylene (PP) material having a thickness of 2 mm with adjusting the irradiation power of the laser beam respectively to 12.0 W, 13.4 W, and 14.0 W. The overlapped portions of the characters were subjected to the non-overlapping treatment.

Example 13

Image recording of Example 13 was performed in the same manner as in Example 10, except that using the LD marker, in which the operation distance and the scanning speed of the laser beam were adjusted respectively to 175 mm (beam diameter of 0.50 mm) and 3,000 mm/s, the character "横", "口" and "一" shown in FIGS. 6A to 6C, each having a size of 2.5 mm×2.5 mm and a line width of 0.25 mm were printed on the thermal recording paper of Production Example 5, with adjusting the irradiation power of the laser beam respectively to 12.0 W, 12.8 W, and 13.2 W. The overlapped portions of the characters were subjected to the non-overlapping treatment.

Comparative Example 1

Image recording of Comparative Example 1 was performed in the same manner as in Example 1, except that using the LD marker, in which the scanning speed of the laser beam and the operation distance were adjusted respectively to 2,500 mm/s and 141 mm, the three characters "横", "口" and "一" shown in FIGS. 6A to 6C, each having a size of 4 mm×4 mm and a line width of 0.4 mm were printed with adjusting the irradiation power of the laser beam to 22.0 W. The overlapped portions of the characters were subjected to the non-overlapping treatment.

Comparative Example 2

Image recording of Comparative Example 2 was performed in the same manner as in Example 1, except that using the LD marker, in which the scanning speed of the laser beam and the operation distance were adjusted respectively to 2,500 mm/s and 141 mm, the three characters "横", "口" and "一" shown in FIGS. 6A to 6C, each having a size of 4 mm×4 mm and a line width of 0.4 mm were printed with adjusting the irradiation power of the laser beam to 20.0 W. The overlapped portions of the characters were subjected to the non-overlapping treatment.

Comparative Example 3

Image recording of Comparative Example 3 was performed in the same manner as in Example 1, except that using the LD marker, in which the scanning speed of the laser beam and the operation distance were adjusted respectively to 2,500 mm/s and 141 mm, the characters "横" shown in FIG. 6A each having a line width of 0.4 mm and a size of 4 mm×4 mm, and a line width of 0.4 mm and a size of 8 mm×8 mm were printed with adjusting the irradiation power of the laser beam to 21.3 W. The overlapped portions of the characters were subjected to the non-overlapping treatment.

Comparative Example 4

Image recording of Comparative Example 4 was performed in the same manner as in Example 1, except that using the LD marker, in which the operation distance and the scanning speed of the laser beam were adjusted respectively to 141 mm and 2,500 mm/s, the characters "横" shown in FIG. 6A each having a size of 8 mm×8 mm and a line width of 0.4 mm, and a size of 8 mm×8 mm and a line width of 0.8 mm (printed with two lines) were printed with adjusting the irradiation power of the laser beam to 21.0 W. The overlapped portions of the characters were subjected to the non-overlapping treatment.

Comparative Example 5

The character "横" shown in FIG. 6A was printed in the same manner as in Comparative Example 1, except that the overlapped portions of the character were not subjected to the non-overlapping treatment.

Comparative Example 6

The character "横" shown in FIG. 6A having a size of 4 mm×4 mm and a line width of 0.4 mm was printed with adjusting the irradiation power of the laser light to 22.0 W in the same manner as in Comparative Example 1, except that the thermoreversible recording medium of Production Example 1 was replaced with the thermoreversible recording medium of Production Example 2. The overlapped portions of the character were subjected to the non-overlapping treatment.

Comparative Example 7

The character "横" shown in FIG. 6A having a size of 4 mm×4 mm and a line width of 0.4 mm was printed with adjusting the irradiation power of the laser beam to 22.0 W in the same manner as in Comparative Example 1, except that the thermoreversible recording medium of Production Example 1 was replaced with the thermoreversible recording medium of Production Example 3. The overlapped portions of the character were subjected to the non-overlapping treatment.

Comparative Example 8

The character "横" shown in FIG. 6A having a size of 4 mm×4 mm and a line width of 0.4 mm was printed with adjusting the irradiation power of the laser beam to 22.0 W in the same manner as in Comparative Example 1, except that the thermoreversible recording medium of Production Example 1 was replaced with the thermoreversible recording medium of Production Example 4. The overlapped portions of the character were subjected to the non-overlapping treatment.

Comparative Example 9

The character "横" shown in FIG. 6A having a size of 2.5 mm×2.5 mm and a line width of 0.25 mm was printed on the thermoreversible recording medium of Production Example 4, in the same manner as in Example 10, except that the operation distance and the scanning speed of the laser beam were adjusted respectively to 175 mm and 3,000 mm/s with adjusting the irradiation power of the laser beam to 16.5 W. The overlapped portions of the character were subjected to the non-overlapping treatment.

Comparative Example 10

The character "轟" shown in FIG. 7A having a size of 3 mm×3 mm and a line width of 0.25 mm was printed on the thermoreversible recording medium of Production Example 4 using the LD marker used in Example 10, in which the scanning speed of the laser beam and the irradiation power of the laser beam were adjusted respectively to 3,000 mm/s and 16.5 W. The entire length L of the drawing line of the character was calculated based on the coordinate information of the character shown in FIG. 7A having a size of 3 mm×3 mm and a line width of 0.25 mm, and an area S of the character was calculated by the formula: L*0.25 mm, to obtain a density of the character "轟". The density of the character "轟" was 0.62. The overlapped portions of the character were subjected to the non-overlapping treatment.

Comparative Example 11

Using the LP-Z FAYb fiber laser (center wavelength: 1,060 nm) produced by Panasonic Electric Works SUNX Co., Ltd., in which the operation distance was adjusted so that a beam diameter became 0.30 mm and the scanning speed of the laser beam was adjusted to 1,000 mm/s, the character "横" shown in FIG. 6A having a size of 2 mm×2 mm and a line width of 0.20 mm was printed on a plate formed of polypropylene (PP) material having a thickness of 2 mm with adjusting the irradiation power of the laser beam to 14.0 W. The overlapped portions of the character were subjected to the non-overlapping treatment.

Comparative Example 12

Image recording of Comparative Example 12 was performed in the same manner as in Example 10, except that the operation distance and the scanning speed of the laser beam were adjusted respectively to 175 mm (beam diameter of 0.50 mm) and 3,000 mm/s, and that the character "横" shown in FIG. 6A having a size of 2.5 mm×2.5 mm and a line width of 0.25 mm was printed on the thermal recording paper of Production Example 5, with adjusting the irradiation power of the laser beam to 13.2 W. The overlapped portions of the character were subjected to the non-overlapping treatment.

Next, the Examples 1 to 13 and Comparative Examples 1 to 12 were evaluated with respect to printed image quality and the durability against repeated use. The results are shown in Tables 1-1 and 1-2.

<Evaluation of Printed Image Quality (Initial)>

The images of the characters were recorded, and the printed image quality (initial) at the time of recording was evaluated based on the following evaluation criteria.

Evaluation Criteria

A: Neither blur nor paint-out occurred, and an image was printed with high definition.

B: An image was printed with slightly blur and paint-out.

<Evaluation of Durability against Repeated Use>

The character which had been evaluated for image quality was repeatedly recorded, and finally, erased with a laser, followed by evaluating a residual image density. The number of recording performed after which the residual image density was more than 0.030 was defined as the durability against repeated use. The results are shown in Tables 1-1 and 1-2.

TABLE 1-1

| | Recording medium | Character | Density of character | Irradiation power (W) | Scanning speed (mm/s) | Irradiation energy (mJ/mm²) | Image printing | Durability against repeated use (times) |
|---|---|---|---|---|---|---|---|---|
| Ex. 1 | Production Ex. 1 | 横*1 | 0.47 | 20.0 | 2,500 | 12.3 | A | 1,270 |
| | | 口 | 0.19 | 21.3 | | 13.1 | A | 1,300 |
| | | 一 | 0.08 | 22.0 | | 13.5 | A | 1,290 |
| Ex. 2 | Production Ex. 1 | 横*1 | 0.47 | 22.0 | 2,750 | 12.3 | A | 1,250 |
| | | 口 | 0.19 | | 2,600 | 13.0 | A | 1,290 |
| | | 一 | 0.08 | | 2,500 | 13.5 | A | 1,270 |
| Ex. 3 | Production Ex. 1 | 横*1 | 0.47 | 21.0 | 2,600 | 12.4 | A | 1,290 |
| Ex. 4 | Production Ex. 1 | 横*1 | 0.47 | 20.0 | 2,500 | 12.3 | A | 1,290 |
| | | 横*2 | 0.25 | 21.0 | | 12.9 | A | 1,310 |
| Ex. 5 | Production Ex. 1 | 横*2 | 0.25 | 21.0 | 2,500 | 12.9 | A | 1,300 |
| | | 横*3 | 0.47 | 20.0 | | 12.3 | A | 1,280 |
| Ex. 6 | Production Ex. 1 | 横*4 | 0.48 | 20.0 | 2,500 | 12.3 | A | 80 |
| Ex. 7 | Production Ex. 2 | 横*1 | 0.47 | 20.0 | 2,500 | 12.3 | A | 20 |
| | | 口 | 0.19 | 21.3 | | 13.1 | A | 23 |
| | | 一 | 0.08 | 22.0 | | 13.5 | A | 25 |
| Ex. 8 | Production Ex. 3 | 横*1 | 0.47 | 20.0 | 2,500 | 12.3 | A | 1,320 |
| | | 口 | 0.19 | 21.3 | | 13.1 | A | 1,340 |
| | | 一 | 0.08 | 22.0 | | 13.5 | A | 1,350 |
| Ex. 9 | Production Ex. 4 | 横*1 | 0.47 | 20.0 | 2,500 | 12.3 | A | 1,280 |
| | | 口 | 0.19 | 21.3 | | 13.1 | A | 1,310 |
| | | 一 | 0.08 | 22.0 | | 13.5 | A | 1,295 |
| Ex. 10 | Production Ex. 4 | 横*5 | 0.47 | 15.0 | 3,000 | 10.0 | A | 1,290 |
| | | 口 | 0.19 | 16.0 | | 10.7 | A | 1,305 |
| | | 一 | 0.08 | 16.5 | | 11.0 | A | 1,300 |
| Ex. 11 | Production Ex. 4 | 轟 | 0.54 | 14.0 | 3,000 | 9.3 | A | 1,210 |
| Ex. 12 | PP | 横*6 | 0.47 | 12.0 | 1,000 | 40.0 | A | — |
| | | 口 | 0.19 | 13.4 | | 44.7 | A | — |
| | | 一 | 0.08 | 14.0 | | 46.7 | A | — |

TABLE 1-1-continued

| | Recording medium | Character | Density of character | Irradiation power (W) | Scanning speed (mm/s) | Irradiation energy (mJ/mm²) | Image printing | Durability against repeated use (times) |
|---|---|---|---|---|---|---|---|---|
| Ex. 13 | Production Ex. 5 | 横*5 | 0.47 | 12.0 | 3,000 | 8.0 | A | — |
| | | 凵 | 0.19 | 12.8 | | 8.5 | A | — |
| | | 一 | 0.08 | 13.2 | | 8.8 | A | — |

横*1: character "横", in which the line width was 0.4 mm, the size was 4 mm × 4 mm, and the overlapped portion was subjected to non-overlapping treatment.

横*2: character "横", in which the line width was 0.4 mm, the size was 8 mm × 8 mm, and the overlapped portion was subjected to non-overlapping treatment.

横*3: character "横", in which the size was 8 mm × 8 mm, the line width was 0.8 mm (printed with two lines), and the overlapped portion was subjected to non-overlapping treatment.

横*4: character "横", in which the size was 4 mm × 4 mm, the line width was 0.4 mm, and the overlapped portion was not subjected to non-overlapping treatment.

横*5: character "横", in which the size was 2.5 mm × 2.5 mm, the line width was 0.25 mm, and the overlapped portion was subjected to non-overlapping treatment.

横*6: character "横", in which the size was 2 mm × 2 mm, the line width was 0.2 mm, and the overlapped portion was subjected to non-overlapping treatment.

Note that the irradiation energy was calculated by the formula: irradiation power/scanning speed/beam diameter, and the unit was mJ/mm².

TABLE 1-2

| | Recording medium | Character | Density of character | Irradiation power (W) | Scanning speed (mm/s) | Irradiation energy (mJ/mm²) | Image printing | Durability against repeated use (times) |
|---|---|---|---|---|---|---|---|---|
| Comp. Ex. 1 | Production Ex. 1 | 横*1 | 0.47 | 22.0 | 2,500 | 13.5 | B | 260 |
| | | 凵 | 0.19 | | | | A | 930 |
| | | 一 | 0.08 | | | | A | 1,290 |
| Comp. Ex. 2 | Production Ex. 1 | 横*1 | 0.47 | 20.0 | 2,500 | 12.3 | A | 1,280 |
| | | 凵 | 0.19 | | | | B | 1,290 |
| | | 一 | 0.08 | | | | B | 1,310 |
| Comp. Ex. 3 | Production Ex. 1 | 横*1 | 0.47 | 21.3 | 2,500 | 13.1 | B | 270 |
| | | 横*2 | 0.25 | | | | B | 280 |
| Comp. Ex. 4 | Production Ex. 1 | 横*2 | 0.25 | 21.0 | 2,500 | 12.9 | B | 250 |
| | | 横*3 | 0.47 | | | | B | 260 |
| Comp. Ex. 5 | Production Ex. 1 | 横*4 | 0.48 | 22.0 | 2,500 | 13.5 | B | 24 |
| Comp. Ex. 6 | Production Ex. 2 | 横*1 | 0.47 | 22.0 | 2,500 | 13.5 | B | 5 |
| Comp. Ex. 7 | Production Ex. 3 | 横*1 | 0.47 | 22.0 | 2,500 | 13.5 | B | 270 |
| Comp. Ex. 8 | Production Ex. 4 | 横*1 | 0.47 | 22.0 | 2,500 | 13.5 | B | 250 |
| Comp. Ex. 9 | Production Ex. 4 | 横*5 | 0.47 | 16.5 | 3,000 | 11.0 | B | 280 |
| Comp. Ex. 10 | Production Ex. 4 | 轟 | 0.62 | 16.5 | 3,000 | 11.0 | B | 5 |
| Comp. Ex. 11 | PP | 横*6 | 0.47 | 14.0 | 1,000 | 46.7 | B | — |
| Comp. Ex. 12 | Production Ex. 5 | 横*5 | 0.47 | 13.2 | 3,000 | 8.8 | B | — |

横*1: character "横", in which the line width was 0.4 mm, the size was 4 mm × 4 mm, and the overlapped portion was subjected to non-overlapping treatment.

横*2: character "横", in which the line width was 0.4 mm, the size was 8 mm × 8 mm, and the overlapped portion was subjected to non-overlapping treatment.

横*3: character "横", in which the size was 8 mm × 8 mm, the line width was 0.8 mm (printed with two lines), and the overlapped portion was subjected to non-overlapping treatment.

横*4: character "横", in which the size was 4 mm × 4 mm, the line width was 0.4 mm, and the overlapped portion was not subjected to non-overlapping treatment.

横*5: character "横", in which the size was 2.5 mm × 2.5 mm, the line width was 0.25 mm, and the overlapped portion was subjected to non-overlapping treatment.

横*6: character "横", in which the size was 2 mm × 2 mm, the line width was 0.2 mm, and the overlapped portion was subjected to non-overlapping treatment.

Note that the irradiation energy was calculated by the formula: irradiation power/scanning speed/beam diameter, and the unit was mJ/mm².

The image processing method and image processing apparatus of the present invention can record high quality image having less bleeding by calculating a density of a character to be recorded based on information of a type, size, and line width of the character to be recorded, and adjusting an irradiation energy of the laser beam according to the density, can attain durability against repeated use in the case of using a thermoreversible recording medium, and can be suitably used particularly for physical distribution and distribution system.

This application claims priority to Japanese patent application No. 2010-158741, filed on Jul. 13, 2010, and incorporated herein by reference.

What is claimed is:

1. An image processing method comprising:
calculating a density of a character to be recorded based on information of a type, size and line width of the character;
adjusting an irradiation energy of a laser beam for recording the character based on the density of the character; and
irradiating a recording medium with the laser beam whose irradiation energy is adjusted so as to record the character thereon,
wherein the adjusting contains adjusting an irradiation energy of a laser beam for a low density of the character to be recorded to be higher than an irradiation energy of a laser beam for a high density of the character to be recorded.

2. The image processing method according to claim 1 An image processing method comprising:
calculating a density of a character to be recorded based on information of a type, size and line width of the character;
adjusting an irradiation energy of a laser beam for recording the character based on the density of the character; and
irradiating a recording medium with the laser beam whose irradiation energy is adjusted so as to record the character thereon,
wherein the calculating contains obtaining an entire length of a drawing line based on the size and type of the character to be recorded, and dividing a product of the entire length of the drawing line and the line width of the character by the size of the character, so as to calculate the density of the character to be recorded.

3. The image processing method according to claim 2, wherein the adjusting contains adjusting an irradiation power of the laser beam to adjust the irradiation energy of the laser beam.

4. The image processing method according to claim 2, wherein the adjusting contains adjusting a scanning speed of the laser beam to adjust the irradiation energy of the laser beam.

5. The image processing method according to claim 1, wherein the adjusting contains adjusting an irradiation power of the laser beam to adjust the irradiation energy of the laser beam.

6. The image processing method according to claim 1, wherein the adjusting contains adjusting a scanning speed of the laser beam to adjust the irradiation energy of the laser beam.

7. The image processing method according to claim 1, further comprising operating the laser beam so as not to irradiate an overlapped portion of the character with the laser beam more than once.

8. The image processing method according to claim 1, wherein the calculating comprising selecting font data of the character to be used based on the information of the size and the line width of the character to be recorded, and calculating the density based on the selected font data.

9. The image processing method according to claim 1, wherein a laser beam source used in the irradiating is at least one selected from a YAG laser beam source, a fiber laser beam source, and a semiconductor laser beam source.

10. The image processing method according to claim 1, wherein the laser beam used in the irradiating has a wavelength of 700 nm to 1,500 nm.

11. The image processing method according to claim 1, wherein the recording medium comprises a support and at least a first thermoreversible recording layer, a photothermal conversion layer containing a photothermal conversion material which absorbs light having a specific wavelength and converts the light into heat, and a second thermoreversible recording layer in this order over the support; and both the first thermoreversible recording layer and the second thermoreversible recording layer reversibly change in color tone depending on temperature.

12. The image processing method according to claim 11, wherein the first thermoreversible recording layer and the second thermoreversible recording layer individually contain a leuco dye and a reversible developer.

13. The image processing method according to claim 11, wherein the photothermal conversion material is a material having an absorption peak in the near-infrared region.

14. The image processing method according to claim 13, wherein the photothermal conversion material is a phthalocyanine-based compound.

15. The image processing method according to claim 13, wherein the photothermal conversion material is an inorganic material.

16. The image processing method according to claim 1, wherein the calculating contains obtaining an entire length of a drawing line based on the size and type of the character to be recorded, and dividing a product of the entire length of the drawing line and the line width of the character by the size of the character, so as to calculate the density of the character to be recorded.

17. An image processing apparatus comprising:
a laser beam emitting unit configured to emit a laser beam; and
an optical scanning unit configured to scan a laser-beam exposing surface with the laser beam,
wherein the image processing apparatus is used for an image processing method, which comprises:
calculating a density of a character to be recorded based on information of a type, size and line width of the character;
adjusting an irradiation energy of the laser beam for recording the character based on the density of the character; and
irradiating a recording medium with the laser beam whose irradiation energy is adjusted so as to record the character thereon, and
wherein the adjusting contains adjusting an irradiation energy of a laser beam for a low density of the character to be recorded to be higher than an irradiation energy of a laser beam for a high density of the character to be recorded.

18. The image processing apparatus according to claim 17, wherein the calculating contains obtaining an entire length of a drawing line based on the size and type of the character to be recorded, and dividing a product of the entire length of the drawing line and the line width of the character by the size of the character, so as to calculate the density of the character to be recorded.

* * * * *